US012203292B2

(12) United States Patent
Chen et al.

(10) Patent No.: US 12,203,292 B2
(45) Date of Patent: Jan. 21, 2025

(54) SLIDE RAIL MECHANISM

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Chi-Chih Chou, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 2 days.

(21) Appl. No.: 18/220,302

(22) Filed: Jul. 11, 2023

(65) Prior Publication Data

US 2024/0263489 A1 Aug. 8, 2024

(30) Foreign Application Priority Data

Feb. 6, 2023 (TW) ................................ 112104344

(51) Int. Cl.
*E05B 65/464* (2017.01)
*E05B 65/463* (2017.01)

(52) U.S. Cl.
CPC .......... *E05B 65/464* (2013.01); *E05B 65/463* (2013.01)

(58) Field of Classification Search
CPC .... E05B 65/462; E05B 65/463; E05B 65/464; A47B 88/50; A47B 2097/008; A47B 2210/0086
See application file for complete search history.

(56) References Cited

U.S. PATENT DOCUMENTS

| | | | | |
|---|---|---|---|---|
| 2,240,067 A * | 4/1941 | Bolesky | ................ | E05B 65/463 312/295 |
| 3,870,387 A * | 3/1975 | Mortashed | ............ | E05B 65/463 312/219 |
| 4,925,257 A * | 5/1990 | Frederiksen | .......... | E05B 65/463 312/221 |

(Continued)

FOREIGN PATENT DOCUMENTS

| | | | | |
|---|---|---|---|---|
| DE | 10124684 C1 * | 3/2003 | ........... | E05B 65/463 |
| EP | 2055876 A1 * | 5/2009 | ........... | E05B 65/463 |

(Continued)

*Primary Examiner* — Andrew Roersma

(74) *Attorney, Agent, or Firm* — Winston Hsu

(57) ABSTRACT

A slide rail mechanism includes a first slide rail assembly, a second slide rail assembly, a third slide rail assembly and a locking member. An opening movement of a second rail of the first slide rail assembly with respect to a first rail of the first slide rail assembly drives the locking member from a first predetermined position to a second predetermined position, and an opening movement of a second rail of the second slide rail assembly with respect to a first rail of the second slide rail assembly drives the locking member from the second predetermined position to a third predetermined position. The locking member at the third predetermined position blocks the third working member for preventing an opening movement of a second rail of the third slide rail assembly with respect to a first rail of the third slide rail assembly.

19 Claims, 18 Drawing Sheets

(56) References Cited

U.S. PATENT DOCUMENTS

| | | | | | |
|---|---|---|---|---|---|
| 5,387,032 | A * | 2/1995 | Reisbeck | .............. | E05B 65/463 312/217 |
| 5,544,957 | A * | 8/1996 | Schmidt | ................ | E05B 65/463 312/216 |
| 5,988,778 | A * | 11/1999 | Lammens | ............. | E05B 65/464 312/219 |
| 6,722,749 | B1 * | 4/2004 | Pagac | ................... | E05B 65/463 312/221 |
| 6,969,129 | B2 | 11/2005 | Ludwig | | |
| 7,823,992 | B2 * | 11/2010 | Chen | ..................... | E05B 65/463 312/216 |
| 2018/0066454 | A1 * | 3/2018 | Lu | .......................... | A47B 67/04 |

FOREIGN PATENT DOCUMENTS

| | | | | | | |
|---|---|---|---|---|---|---|
| JP | H-0673941 | A | * | 3/1994 | ............. | E05B 65/46 |
| KR | 101771929 | B1 | * | 8/2017 | ............. | E05B 65/46 |

* cited by examiner

SLIDE RAIL MECHANISM

BACKGROUND OF THE INVENTION

1. Field of the Invention

The present invention relates to a slide rail product, and more specifically, to a slide rail mechanism with an improved interlock.

2. Description of the Prior Art

U.S. Pat. No. 4,925,257 discloses a cabinet device including a plurality of drawers and a cabinet body. Each of the plurality of drawers is slidable with respect to the cabinet body between an opening position and a retracting position. The cabinet device further includes a locking rod mounted on the cabinet body and displaceable between a first position and a second position for preventing two of the plurality of drawers from being opened simultaneously by a linking structure between the locking rod and the plurality of drawers.

From the above, the aforementioned locking rod only can prevent two of the plurality of drawers from being opened simultaneously. However, to meet different requirements, it becomes an important topic to provide a slide rail product with an improved interlock.

SUMMARY OF THE INVENTION

The present invention provides a slide rail mechanism with an improved interlock.

According to an aspect of the invention, a slide rail mechanism includes a first slide rail assembly, a second slide rail assembly, a third slide rail assembly, a first working member, a second working member, a third working member, a locking member, a first auxiliary feature, a second auxiliary feature and a third auxiliary feature. Each of the first slide rail assembly, the second slide rail assembly and the third slide rail assembly includes a first rail and a second rail displaceable with respect to the first rail. The first working member is arranged on the second rail of the first slide rail assembly. The second working member is arranged on the second rail of the second slide rail assembly. The third working member is arranged on the second rail of the third slide rail assembly. The locking member is movable with respect to the first rail of each of the first slide rail assembly, the second slide rail assembly and the third slide rail assembly. The first auxiliary feature is arranged on the locking member. The second auxiliary feature is arranged on the locking member. The third auxiliary feature is arranged on the locking member. The first working member abuts against the first auxiliary feature for driving the locking member from a first predetermined position to a second predetermined position during an opening movement of the second rail of the first slide rail assembly with respect to the first rail of the first slide rail assembly. The second working member abuts against the second auxiliary feature for driving the locking member from the second predetermined position to a third predetermined position during an opening movement of the second rail of the second slide rail assembly with respect to the first rail of the second slide rail assembly. The third auxiliary feature blocks the third working member for preventing an opening movement of the second rail of the third slide rail assembly with respect to the first rail of the third slide rail assembly when the locking member is located at the third predetermined position.

According to another aspect of the invention, a slide rail mechanism is adapted for a rack. The slide rail mechanism includes a first slide rail assembly, a second slide rail assembly, a third slide rail assembly, a first working member, a second working member, a third working member, a locking member, a first auxiliary feature, a second auxiliary feature and a third auxiliary feature. The first slide rail assembly is configured to be mounted on the rack. The second slide rail assembly is configured to be mounted on the rack. The third slide rail assembly is configured to be mounted on the rack, and each of the first slide rail assembly, the second slide rail assembly and the third slide rail assembly includes a first rail and a second rail longitudinally displaceable with respect to the first rail. The first working member is arranged on the second rail of the first slide rail assembly. The second working member is arranged on the second rail of the second slide rail assembly. The third working member is arranged on the second rail of the third slide rail assembly. The locking member is movable with respect to the rack. The first auxiliary feature is arranged on the locking member. The second auxiliary feature is arranged on the locking member. The third auxiliary feature is arranged on the locking member. The first working member abuts against the first auxiliary feature for driving the locking member from a first predetermined position to a second predetermined position during an opening movement of the second rail of the first slide rail assembly with respect to the first rail of the first slide rail assembly. An opening movement of the second rail of the second slide rail assembly with respect to the first rail of the second slide rail assembly and an opening movement of the second rail of the third slide rail assembly with respect to the first rail of the third slide rail assembly are allowed when the locking member is located at the second predetermined position. The second working member abuts against the second auxiliary feature for driving the locking member from the second predetermined position to a third predetermined position during the opening movement of the second rail of the second slide rail assembly with respect to the first rail of the second slide rail assembly. The third auxiliary feature blocks the third working member for preventing the opening movement of the second rail of the third slide rail assembly with respect to the first rail of the third slide rail assembly when the locking member is located at the third predetermined position.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure (s) being described. The members of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
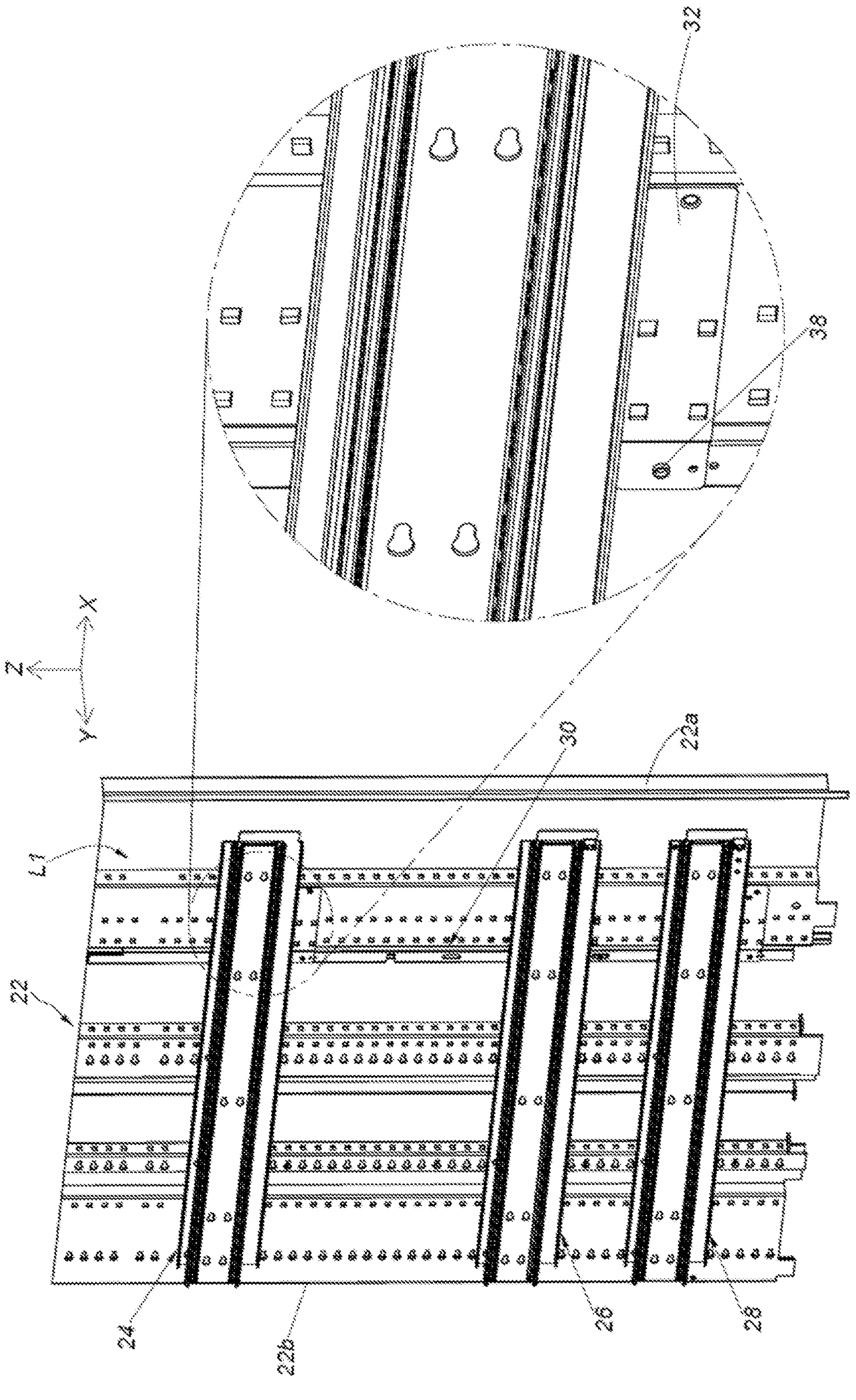
FIG. 1 and FIG. 2 are diagrams of a slide rail mechanism adapted for a rack at different views according to an embodiment of the present invention.
Figure 2:
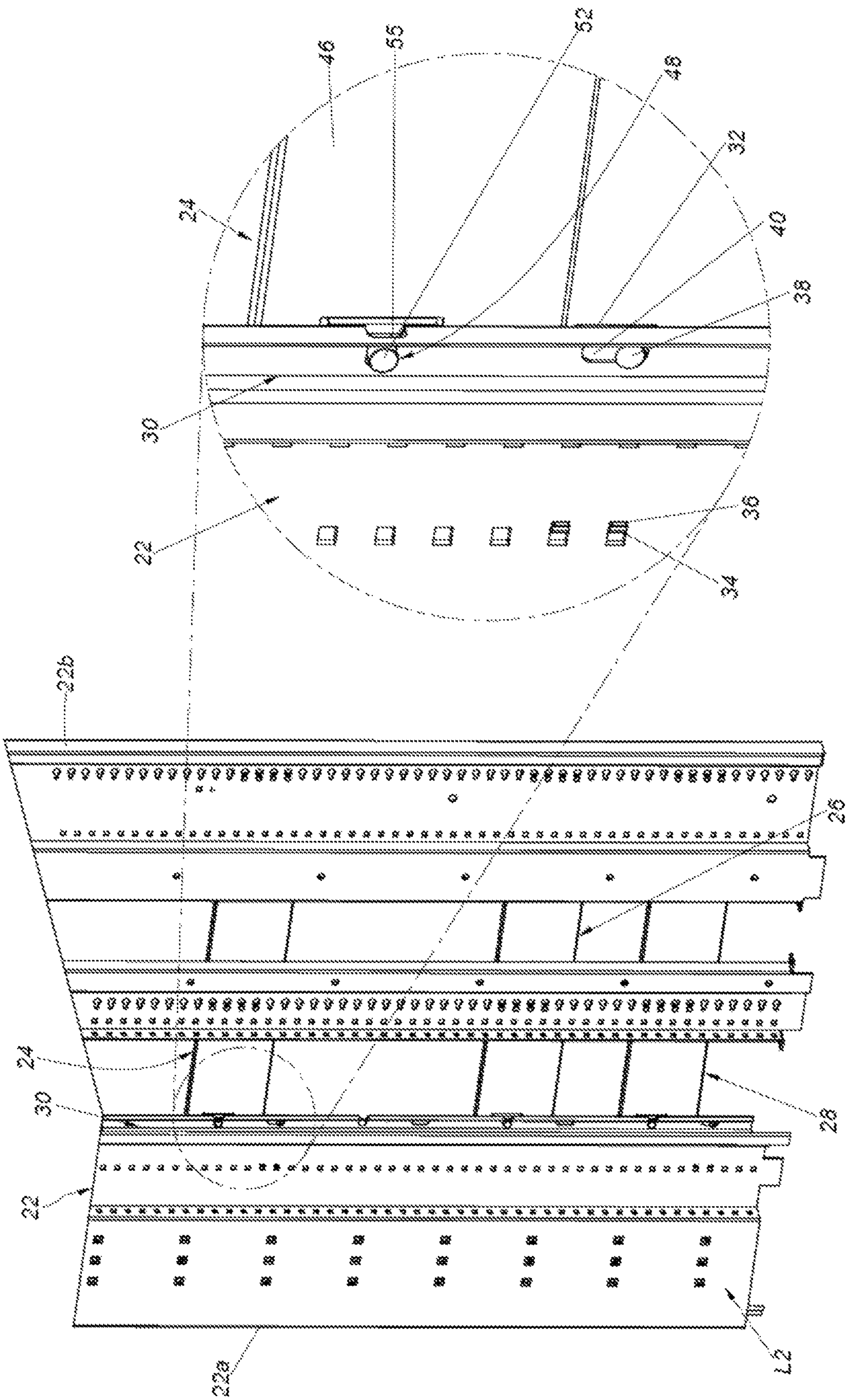

As shown in FIG. 1 and FIG. 2, a slide rail mechanism is adapted for a rack 22 and configured to be mounted on a wall or a post of the rack 22. The rack 22 includes a first end portion 22*a*, e.g., a front end portion, and a second end portion 22*b*, e.g., a rear end portion. The slide rail mechanism includes a first slide rail assembly 24, a second slide rail assembly 26, a third slide rail assembly 28 and a locking member 30. The wall of the rack 22 includes a first side L1 as shown in FIG. 1 and a second side L2 as shown in FIG. 2. The first slide rail assembly 24, the second slide rail assembly 26 and the third slide rail assembly 28 are configured to be mounted on the rack 22. In this embodiment, by way of example, the first slide rail assembly 24, the second slide rail assembly 26 and the third slide rail assembly 28 can be mounted on the first side L1 of the wall of the rack 22. The first slide rail assembly 24, the second slide rail assembly 26 and the third slide rail assembly 28 can have substantially identical structures. The first slide rail assembly 24 is spaced away from the second slide rail assembly 26 by a first predetermined distance along a height direction of the rack 22, and the second slide rail assembly 26 is spaced away from the third slide rail assembly 28 along the height direction of the rack 22 by a second predetermined distance. In this embodiment, by way of example, the first predetermined distance can be substantially equal to the second predetermined distance.

The locking member 30 is movable with respect to the rack 22. In this embodiment, by way of example, the locking member 30 can be movably mounted on the rack 22. However, the present invention is not limited to this embodiment. For example, in another embodiment, the locking member can be movably mounted on at least one rail of the first slide rail assembly 24, the second slide rail assembly 26 and the third slide rail assembly 28.

Preferably, the locking member 30 is a rod. A longitudinal direction of the locking member 30 is substantially parallel to the height direction of the rack 22, e.g., a Z axis.

Preferably, the locking member 30 is detachably mounted on the rack 22. In this embodiment, by way of example, as shown in FIG. 2, the locking member 30 can be mounted on the rack 22 by a mounting member 32, and the mounting member 32 can be mounted onto the rack 22 by an engagement of at least one mounting feature 34, e.g., a protruding portion, of the mounting member 32 and at least one corresponding feature 36, e.g., a mounting hole, of the rack 22. However, the present invention is not limited to this embodiment. For example, in another embodiment, the locking member can be fastened onto the rack by a fastening member, such as a screw or a bolt.

Preferably, a first restraining feature 38 is arranged on one of the rack 22 and the mounting member 32. In this embodiment, by way of example, the first restraining feature 38 can be arranged on the mounting member 32. Furthermore, a second restraining feature 40 is arranged on the locking member 30. As shown in FIG. 2, by a cooperation of the first restraining feature 38 and the second restraining feature 40, the locking member 30 is only allowed to move with respect to the rack 22 within a predetermined limited range along the height direction of the rack 22. Besides, one of the first restraining feature 38 and the second restraining feature 40 is an elongated hole or an elongated slot, and the other one of the first restraining feature 38 and the second restraining feature 40 is a protruding object passing through a portion of the elongated hole or the elongated slot. In this embodiment, by way of example, as shown in FIG. 2, the first restraining feature 38 can be the protruding object, and the second restraining feature 40 can be the elongated hole.

Figure 3:
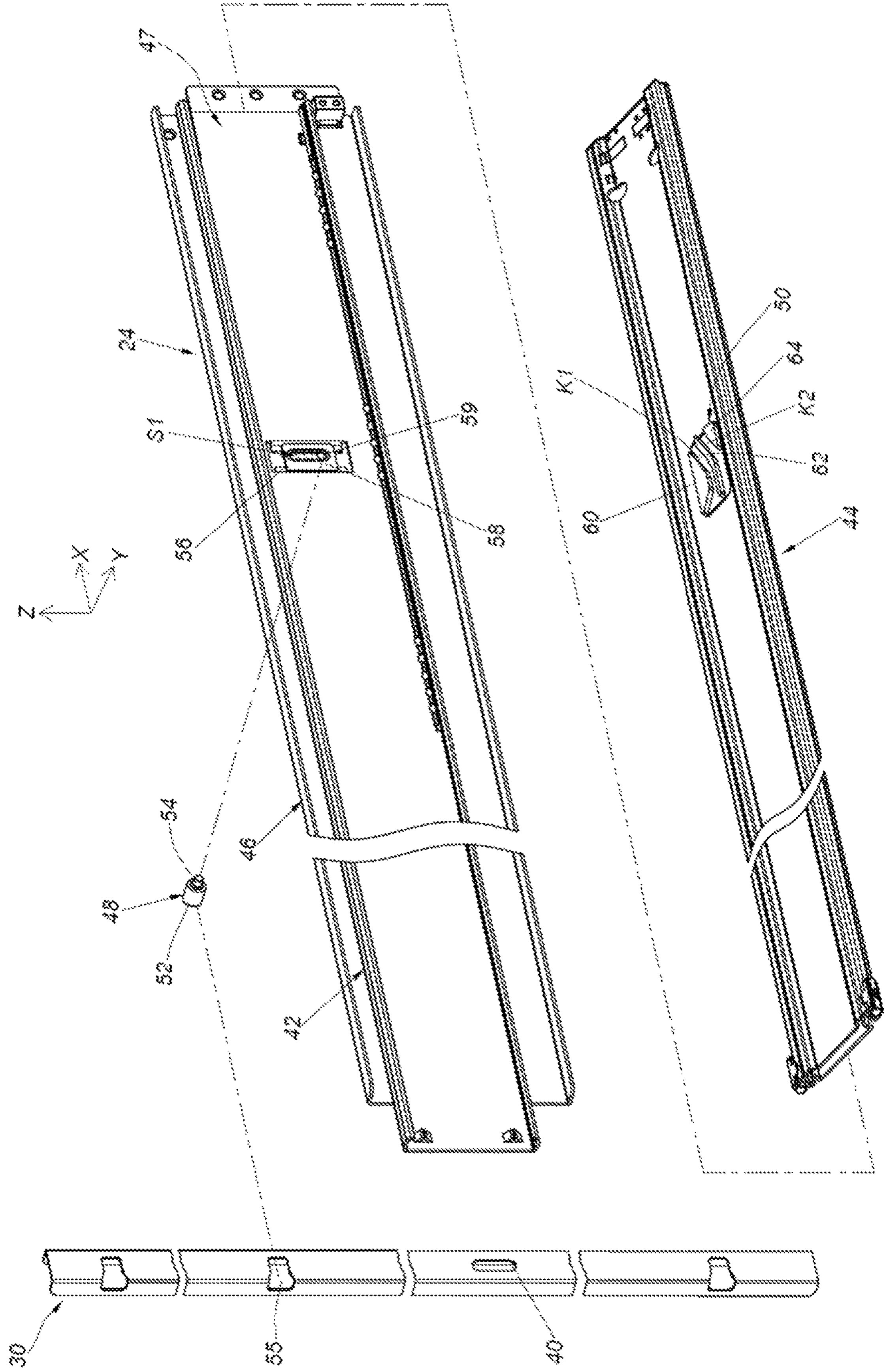
FIG. 3 is an exploded diagram of the slide rail mechanism according to the embodiment of the present invention.

As shown in FIG. 3, the first slide rail assembly 24 includes a first rail 42 and a second rail 44 longitudinally displaceable with respect to the first rail 42. The first rail 42 of the first slide rail assembly 24 is configured to be mounted on the rack 22. In this embodiment, by way of example, as shown in FIG. 2, the first rail 42 of the first slide rail assembly 24 can be mounted on the rack 22 by a first bracket 46. The first bracket 46 can be attached or fixed onto the first rail 42 of the first slide rail assembly 24, and the first bracket 46 and the first rail 42 of the first slide rail assembly 24 can be defined as an integral structure, i.e., the first bracket 46 can be considered as a part of the first rail 42 of the first slide rail assembly 24. The first rail 42 of the first slide rail assembly 24 includes a first channel 47 configured to at least accommodate the second rail 44 of the first slide rail assembly 24. The second rail 44 of the first slide rail assembly 24 is configured to support a carried object, such as a server, a chassis, a drawer or the like.

In this embodiment, by way of example, a longitudinal direction, i.e., a length direction or a displacing direction of a rail, can be parallel to an X axis. A transverse direction, i.e., a lateral direction of the rail, can be parallel to a Y axis. A vertical direction, i.e., a height direction of the rail or the height direction of the rack 22, can be parallel to the Z axis.

The second slide rail assembly 26 includes a first rail 68 and a second rail 66 longitudinally displaceable with respect to the first rail 68. The first rail 68 of the second slide rail assembly 26 is configured to be mounted on the rack 22. In this embodiment, by way of example, the first rail 68 of the second slide rail assembly 26 can be mounted on the rack 22 by a second bracket 84. The second bracket 84 can be attached or fixed onto the first rail 68 of the second slide rail assembly 26, and the second bracket 84 and the first rail 68 of the second slide rail assembly 26 can be defined as an integral structure, i.e., the second bracket 84 can be considered as a part of the first rail 68 of the second slide rail assembly 26. The first rail 68 of the second slide rail assembly 26 includes a second channel configured to at least accommodate the second rail 66 of the second slide rail assembly 26. The second rail 66 of the second slide rail assembly 26 is configured to support a carried object, such as a server, a chassis, a drawer or the like.

The third slide rail assembly 28 includes a first rail 72 and a second rail 70 longitudinally displaceable with respect to the first rail 72. The first rail 72 of the third slide rail assembly 28 is configured to be mounted on the rack 22. In this embodiment, by way of example, the first rail 72 of the third slide rail assembly 28 can be mounted on the rack 22 by a third bracket 88. The third bracket 88 can be attached or fixed onto the first rail 72 of the third slide rail assembly 28, and the third bracket 88 and the first rail 72 of the third slide rail assembly 28 can be defined as an integral structure, i.e., the third bracket 88 can be considered as a part of the first rail 72 of the third slide rail assembly 28. The first rail 72 of the third slide rail assembly 28 includes a third channel configured to at least accommodate the second rail 70 of the third slide rail assembly 28. The second rail 70 of the third slide rail assembly 28 is configured to support a carried object, such as a server, a chassis, a drawer or the like.

The slide rail mechanism further includes a first working member 50, a second working member 74, a third working member 76, a first auxiliary feature 48, a second auxiliary feature 78 and a third auxiliary feature 80. The first working member 50 is arranged on the second rail 44 of the first slide rail assembly 24. The second working member 74 is arranged on the second rail 66 of the second slide rail assembly 26. The third working member 76 is arranged on the second rail 70 of the third slide rail assembly 28. The first auxiliary feature 48, the second auxiliary feature 78 and the third auxiliary feature 80 are arranged on the locking member 30 and configured to cooperate with the first working member 50, the second working member 74 and the third working member 76 respectively.

Preferably, a first space S1 is formed on the first rail 42 of the first slide rail assembly 24. A second space S2 is formed on the first rail 68 of the second slide rail assembly 26. A third space S3 is formed on the first rail 72 of the third slide rail assembly 28. The first auxiliary feature 48 passes through the first space S1 to cooperate with the first working member 50 arranged on the second rail 44 of the first slide rail assembly 24. The second auxiliary feature 78 passes through the second space S2 to cooperate with the second working member 74 arranged on the second rail 66 of the second slide rail assembly 26. The third auxiliary feature 80 passes through the third space S3 to cooperate with the third working member 76 arranged on the second rail 70 of the third slide rail assembly 28.

Preferably, in this embodiment, by way of example, each of the first auxiliary feature 48, the second auxiliary feature 78 and the third auxiliary feature 80 can be a positioning pin or a column-shaped structure. However, the present invention is not limited to this embodiment. As shown in FIG. 2, the first auxiliary feature 48 includes a first extending portion 52 and a second extending portion 54 connected to the first extending portion 52. The first extending portion 52 has a first dimension, and the second extending portion 54 has a second dimension less than the first dimension. Besides, the first extending portion 52 is connected to the locking member 30 and engaged with a corresponding space 55 of the locking member 30, and the second extending portion 54 extends toward the second rail 44 of the first slide rail assembly 24 through the first space S1 on the first rail 42 of the first slide rail assembly 24.

Preferably, at least one first supporting section 56 is arranged on a position corresponding to the first space S1, the first slide rail assembly 24 further includes a first auxiliary member 58 mounted inside the first space S1 and supported by the at least one first supporting section 56. A first hole 59 is formed on the first auxiliary member 58. A height of the first auxiliary member 58 is less than a height of the first space S1, such that the first auxiliary member 58 is movable with respect to the first space S1 along the height direction H, e.g., the Z axis.

Figure 5:
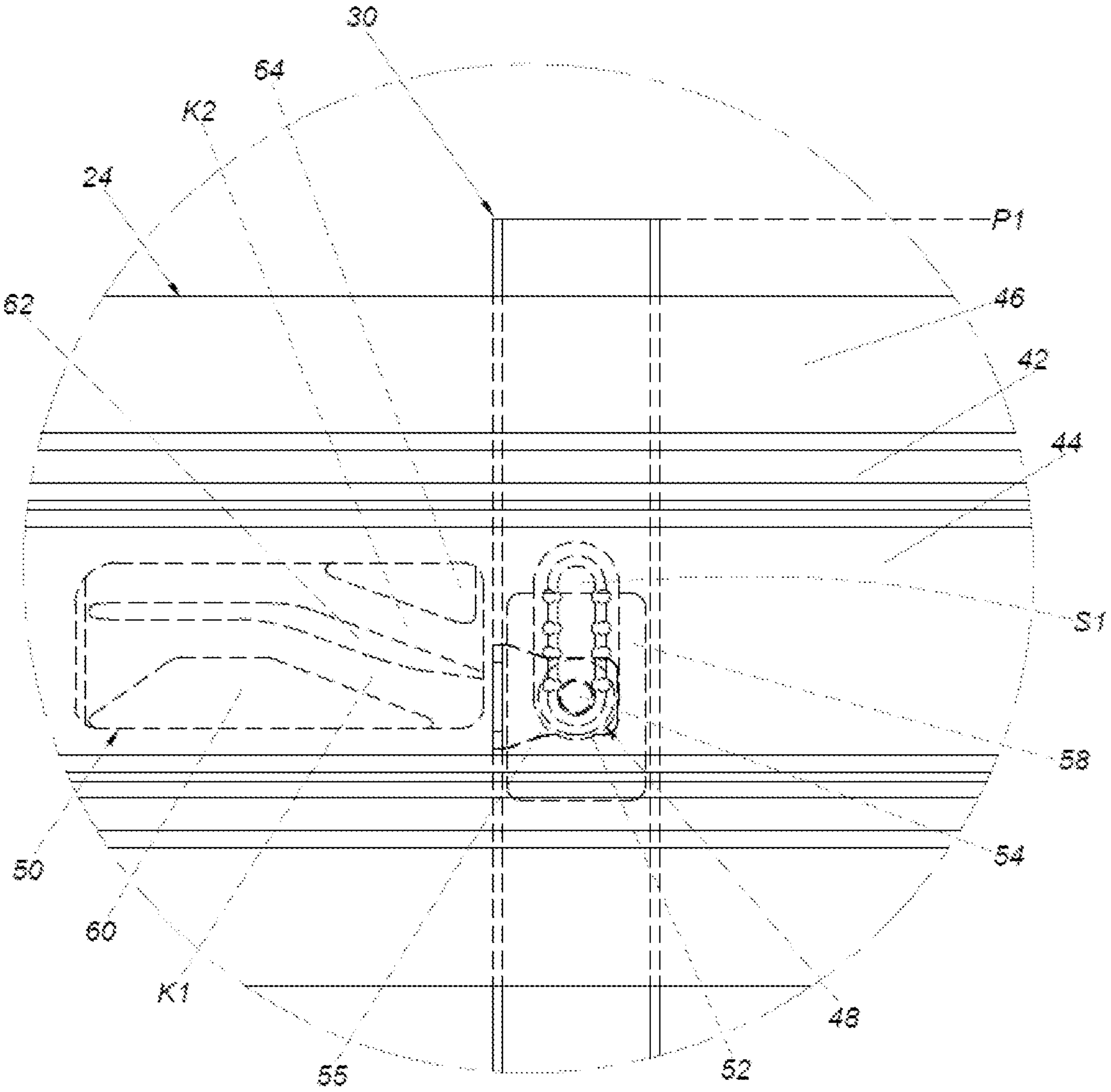
FIG. 5 is an enlarged diagram of an A portion of the slide rail mechanism shown in FIG. 4 according to the embodiment of the present invention.

As shown in FIG. 3 and FIG. 5, the second extending portion 54 of the first auxiliary feature 48 extends toward the second rail 44 of the first slide rail assembly 24 through the first space S1 on the first rail 42 of the first slide rail assembly 24 and the first hole 59 on the first auxiliary member 58, such that the first auxiliary feature 48 can cooperate with the first working member 50 on the second rail 44 of the first slide rail assembly 24.

Besides, the first auxiliary feature 48, the second auxiliary feature 78 and the third auxiliary feature 80 can have substantially identical structures. That is, a second extending portion 82 of the second auxiliary feature 78 extends toward the second rail 66 of the second slide rail assembly 26 through the second space S2 on the first rail 68 of the second slide rail assembly 26 and a second hole on a second auxiliary member, which is mounted inside the second space S2 and supported by at least one second supporting section arranged on a position corresponding to the second space S2, and a second extending portion 86 of the third auxiliary feature 80 extends toward the second rail 70 of the third slide rail assembly 28 through the third space S3 on the first rail 72 of the third slide rail assembly 28 and a third hole on a third auxiliary member, which is mounted inside the third space S3 and supported by at least one third supporting section arranged on a position corresponding to the third space S3. Detailed description for the second auxiliary feature 78 and the third auxiliary feature 80 is omitted herein for simplicity.

Preferably, the first working member 50 includes a first portion 60, a second portion 62 and a third portion 64. The second portion 62 is located between the first portion 60 and the third portion 64. A first guiding path K1 is formed between the first portion 60 and the second portion 62. A second guiding path K2 is formed between the second portion 62 and the third portion 64. The first working member 50, the second working member 74 and the third working member 76 can have substantially identical structures. Detailed description for the second working member 74 and the third working member 76 is omitted herein for simplicity.

Figure 4:
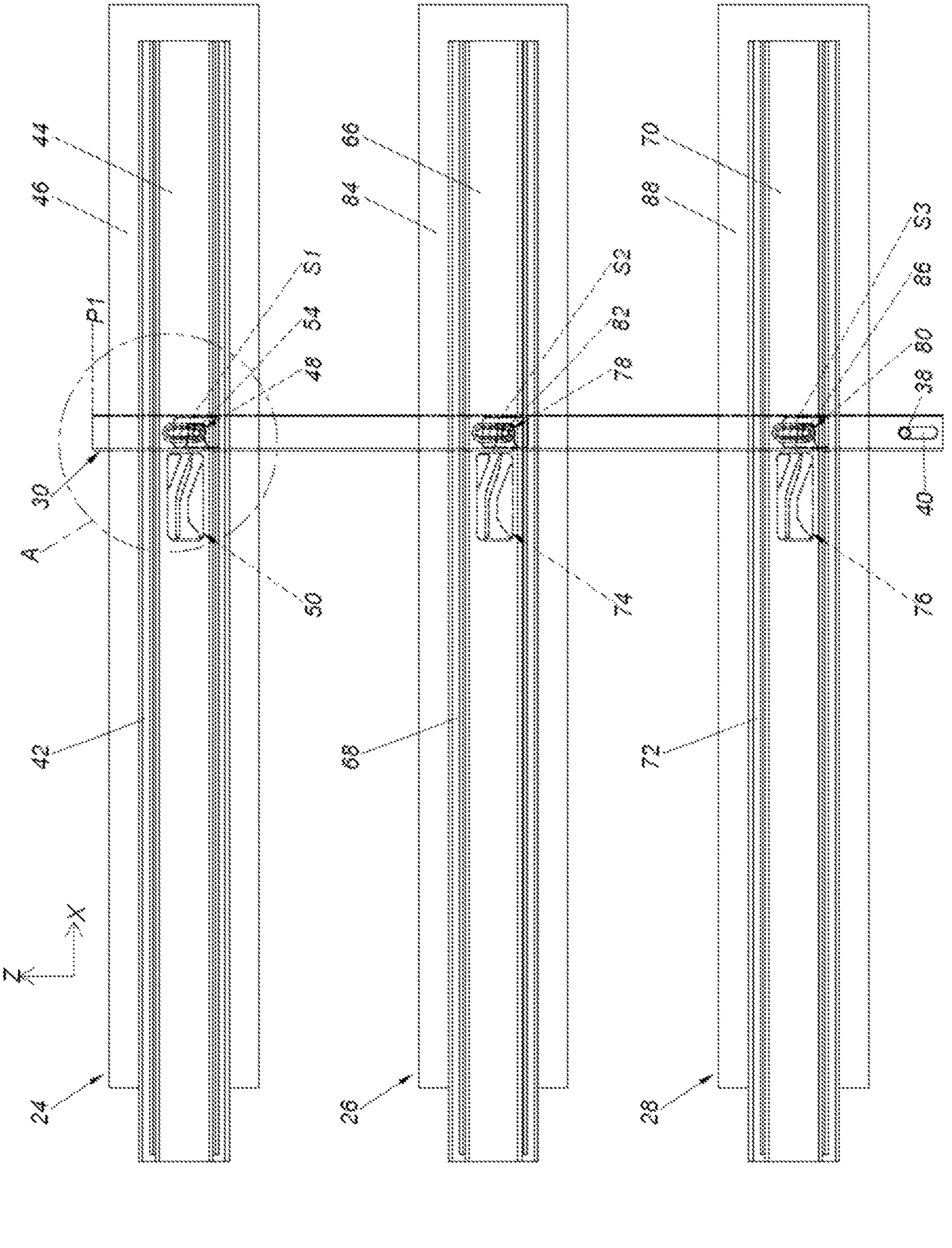
FIG. 4 is a diagram of the slide rail mechanism as a locking member is located at a first predetermined position according to the embodiment of the present invention.

FIG. 4 illustrates the second restraining feature 40 which is configured to cooperate with the first restraining feature 38 for allowing the locking member 30 to be movable within the predetermined limited range along the height direction H, e.g., the Z axis, without the rack 22.

As shown in FIG. 4, each of the first slide rail assembly 24, the second slide rail assembly 26 and the third slide rail assembly 28 is in a retracted state. In other words, the second rail 44 of the first slide rail assembly 24, the second rail 66 of the second slide rail assembly 26 and the second rail 70 of the third slide rail assembly 28 are retracted with respect to the first rail 42 of the first slide rail assembly 24, the first rail 68 of the second slide rail assembly 26 and the first rail 72 of the third slide rail assembly 28, respectively. Besides, at this moment, the locking member 30 is located at a first predetermined position P1.

Figure 6:
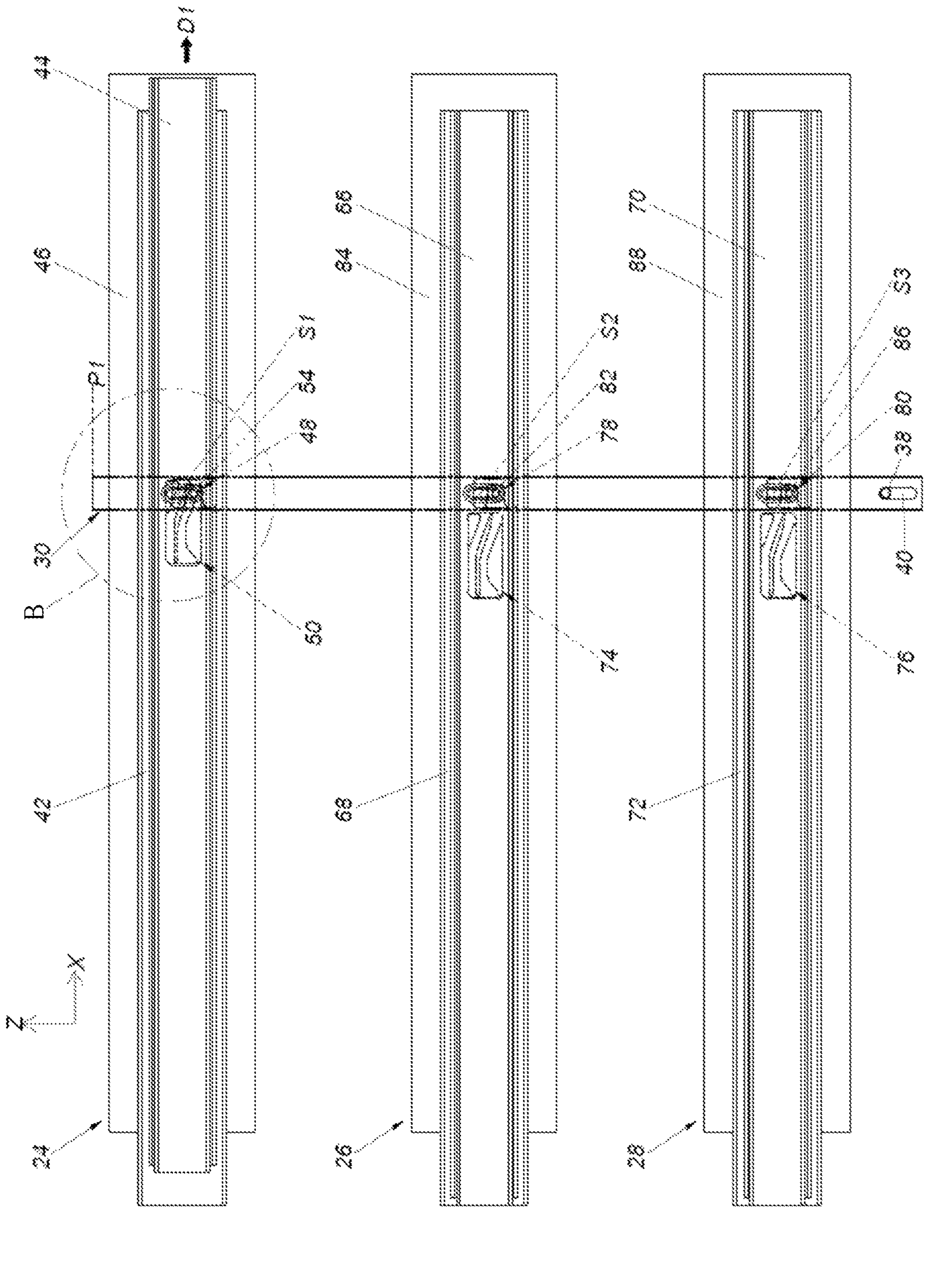
FIG. 6 is a diagram of the slide rail mechanism as a second rail of the first slide rail assembly displaces with respect to a first rail of the first slide rail assembly along an opening direction according to the embodiment of the present invention.
Figure 7:
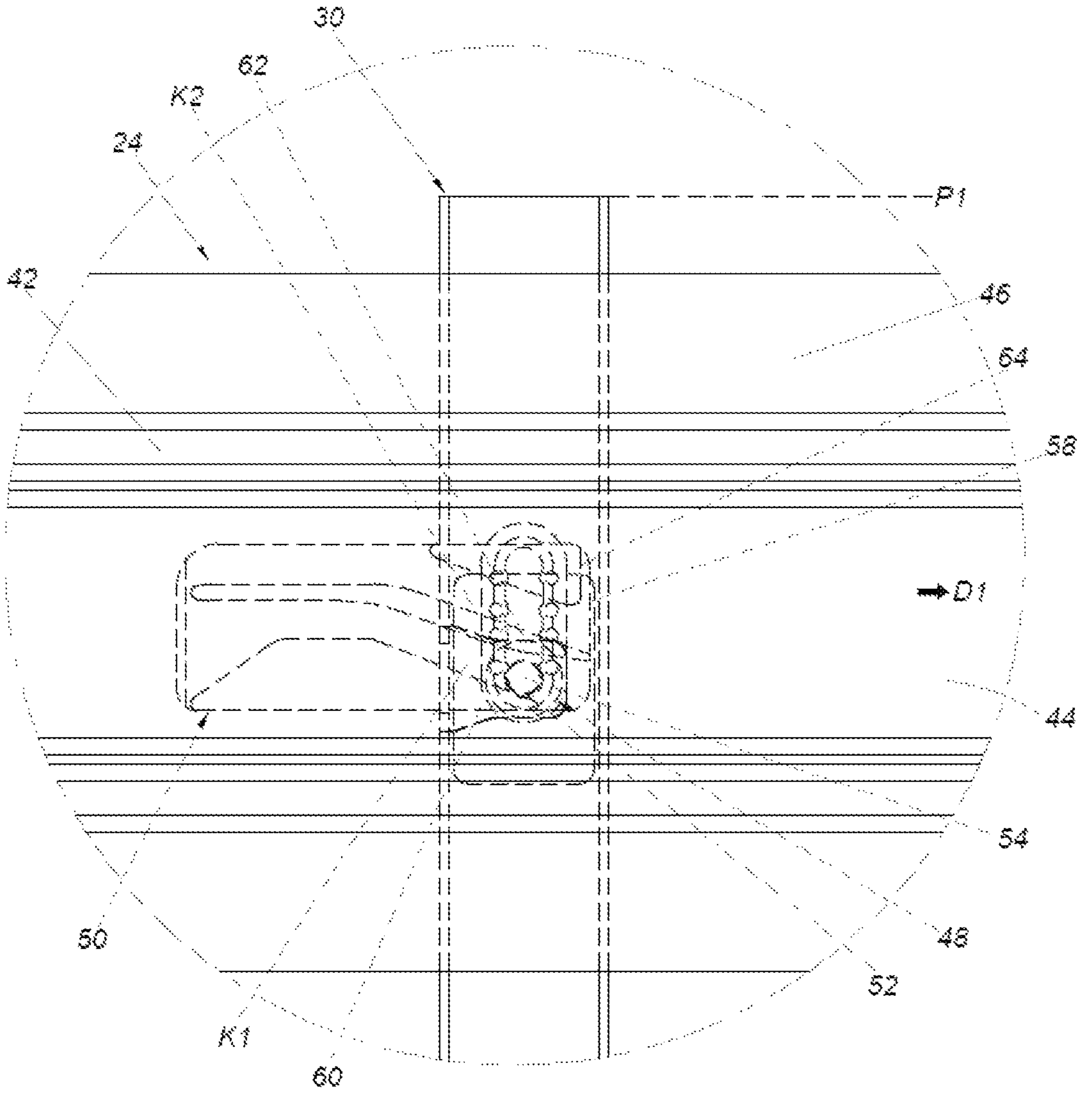
FIG. 7 is an enlarged diagram of a B portion of the slide rail mechanism shown in FIG. 6 according to the embodiment of the present invention.
Figure 8:
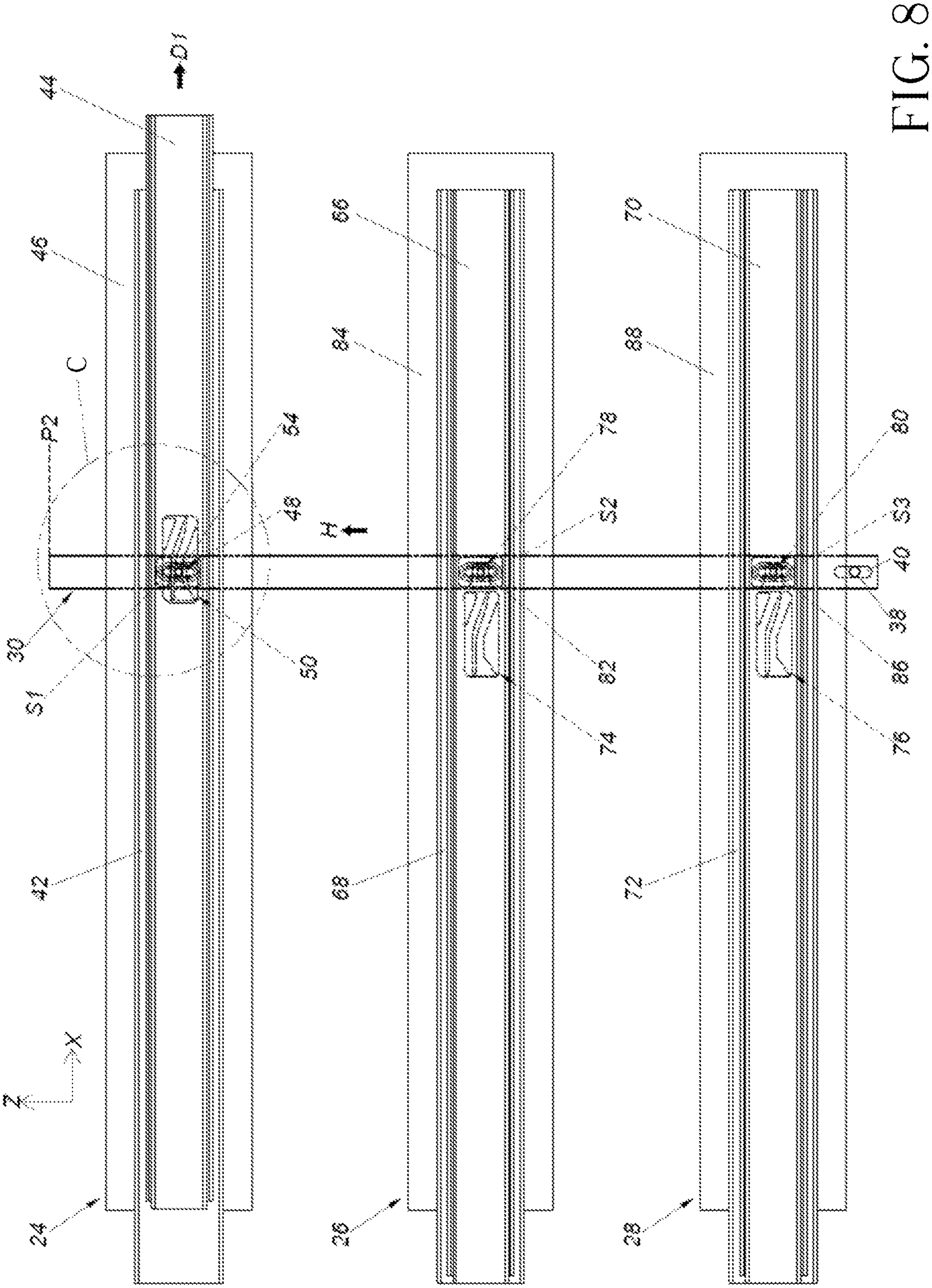
FIG. 8 is a diagram of the slide rail mechanism as the locking member is driven to a second predetermined position by the second rail of the first slide rail assembly displacing with respect to the first rail of the first slide rail assembly along the opening direction according to the embodiment of the present invention.
Figure 9:
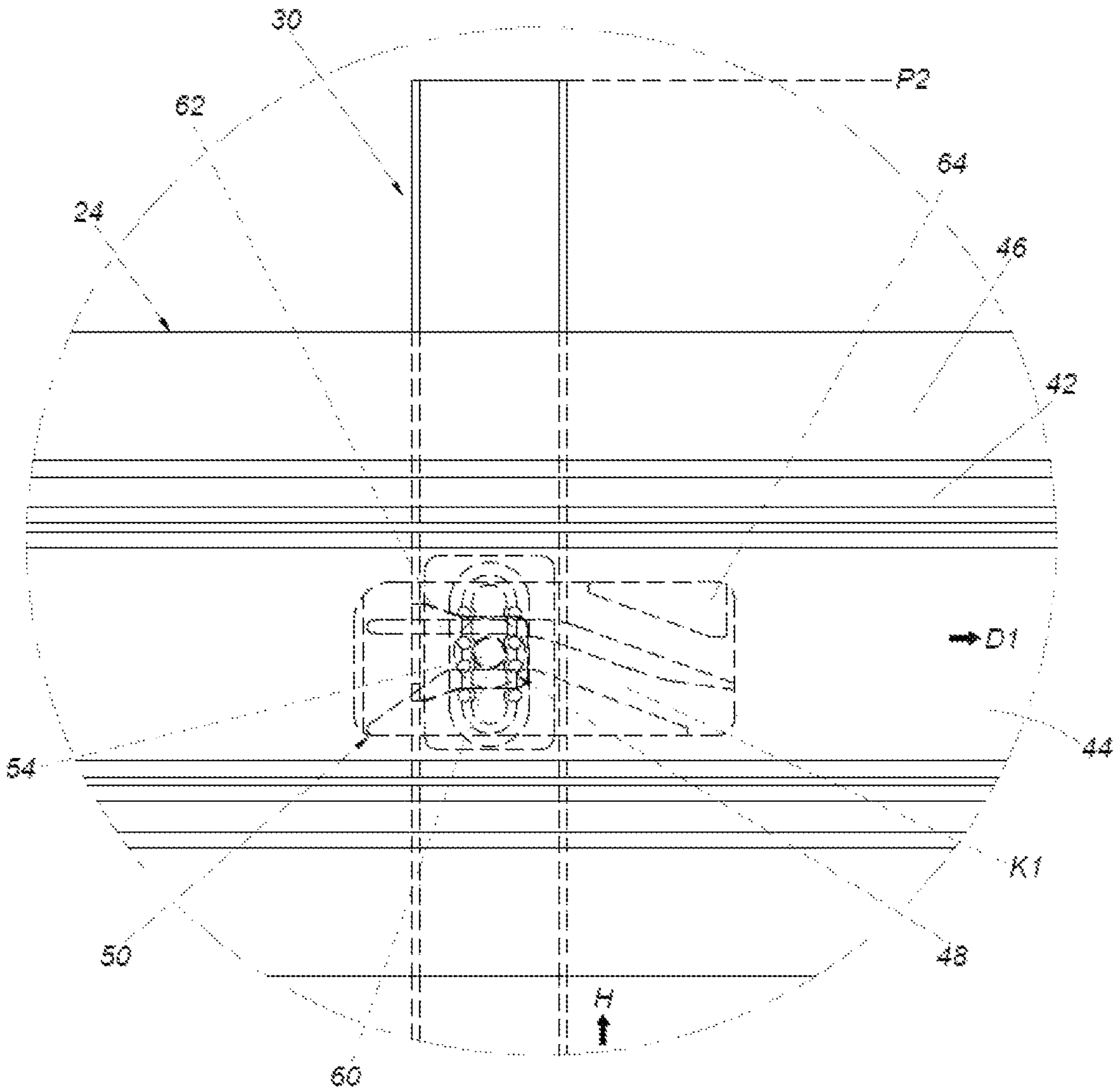
FIG. 9 is an enlarged diagram of a C portion of the slide rail mechanism shown in FIG. 8 according to the embodiment of the present invention.

As shown in FIG. 6 to FIG. 9, during an opening movement of the second rail 44 of the first slide rail assembly 24 with respect to the first rail 42 of the first slide rail assembly 24 along an opening direction D1, the first working member 50 abuts against the first auxiliary feature 48 for driving the locking member 30 from the first predetermined position P1 as shown in FIG. 6 and FIG. 7 to a second predetermined position P2 as shown in FIG. 8 and FIG. 9.

Preferably, during the opening movement of the second rail 44 of the first slide rail assembly 24 with respect to the first rail 42 of the first slide rail assembly 24 along the opening direction D1, the first auxiliary feature 48, e.g., the second extending portion 54 of the first auxiliary feature 48, enters the first guiding path K1 of the first working member 50 and then moves along the first guiding path K1 by an abutment of the first portion 60 of the first working member 50 and the first auxiliary feature 48, e.g., the second extending portion 54 of the first auxiliary feature 48, for driving the locking member 30 from the first predetermined position P1 as shown in FIG. 6 and FIG. 7 to the second predetermined position P2 as shown in FIG. 8 and FIG. 9 along the height direction H. That is, the locking member 30 is driven to move with respect to the rack 22 or each of the first rail 42 of the first slide rail assembly 24, the first rail 68 of the second slide rail assembly 26 and the first rail 72 of the third slide rail assembly 28 along the height direction H.

Figure 10:
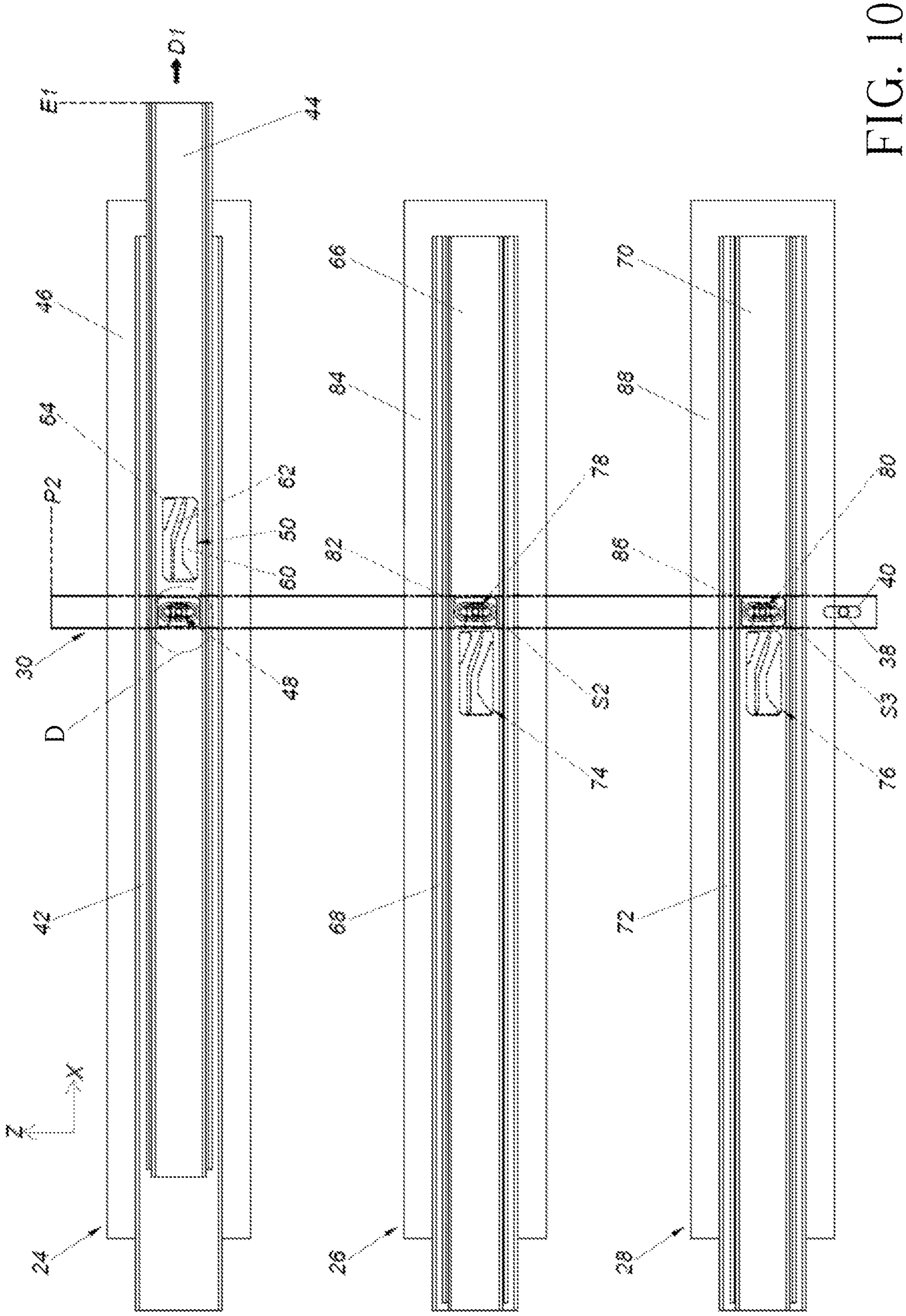
FIG. 10 is a diagram of the slide rail mechanism as the second rail of the first slide rail assembly further displaces with respect to the first rail of the first slide rail assembly along the opening direction according to the embodiment of the present invention.
Figure 11:
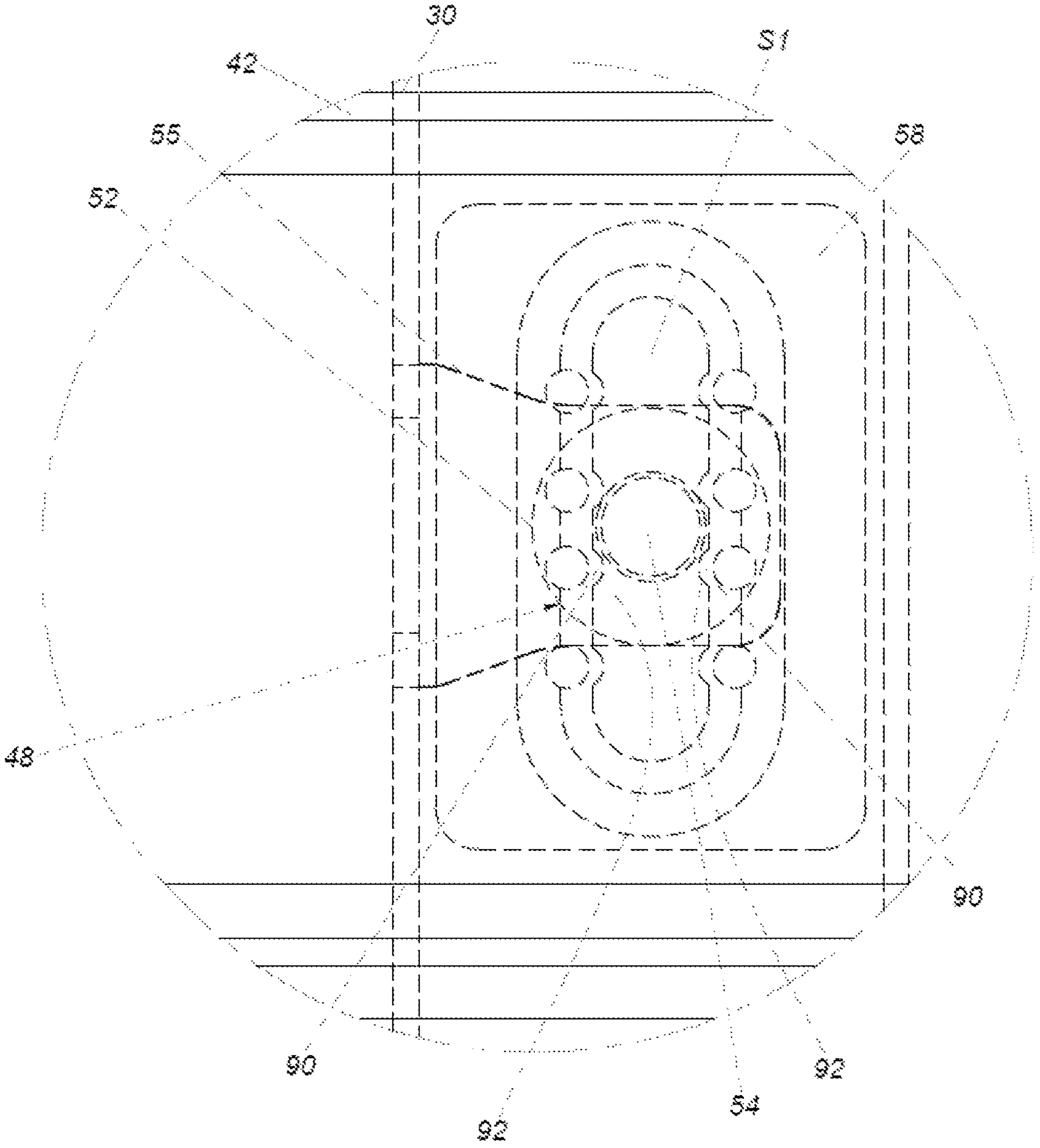
FIG. 11 is an enlarged diagram of a D portion of the slide rail mechanism shown in FIG. 10 according to the embodiment of the present invention.

As shown in FIG. 10 and FIG. 11, one of the first rail 42 of the first slide rail assembly 24, the first rail 68 of the second slide rail assembly 26 and the first rail 72 of the third slide rail assembly 28 includes at least one first retaining feature 90. When the locking member 30 is moved to the second predetermined position P2 and the first working member 50 is disengaged from the first auxiliary feature 48 by the second rail 44 of the first slide rail assembly 24 displacing to a first extended position E1 with respect to the first rail 42 of the first slide rail assembly 24 along the opening direction D1, the at least one first retaining feature 90 can support one of the first auxiliary feature 48, the second auxiliary feature 78 and the third auxiliary feature 80 for retaining the locking member 30 at the second predetermined position P2. In this embodiment, by way of example, each of the first rail 42 of the first slide rail assembly 24, the first rail 68 of the second slide rail assembly 26 and the first rail 72 of the third slide rail assembly 28 includes the at least one first retaining feature 90. However, the present invention is not limited to this embodiment.

Specifically, each of the first rail 42 of the first slide rail assembly 24, the first rail 68 of the second slide rail assembly 26 and the first rail 72 of the third slide rail assembly 28 includes the plurality of retaining features 90 configured to support the first auxiliary feature 48, the second auxiliary feature 78 and the third auxiliary feature 80 for retaining the locking member 30 at the second predetermined position P2. For example, as shown in FIG. 11, the plurality of first retaining features 90 of the first rail 42 of the first slide rail assembly 24 are located inside the first space S1. As shown in FIG. 10 and FIG. 11, when the locking member 30 is moved to the second predetermined position P2, the plurality of first retaining features 90 can support the first auxiliary feature 48, e.g., the second extending portion 54 of the first auxiliary feature 48, for retaining the locking member 30 at the second predetermined position P2. Preferably, each of the first retaining features 90 is resilient or flexible and includes a first guiding surface 92 formed in an arc shape, such that the first auxiliary feature 48, e.g., the second extending portion 54 of the first auxiliary feature 48, can pass over the corresponding first retaining features 90 easily in response to a movement of the locking member 30 from the first predetermined position P1 to the second predetermined position P2 along the height direction H.

Besides, the plurality of first retaining features 90 of the first rail 42 of the first slide rail assembly 24, the first rail 68 of the second slide rail assembly 26 and the first rail 72 of the third slide rail assembly 28 can have substantially identical structures. That is, the plurality of first retaining features 90 of the first rail 68 of the second slide rail assembly 26 are located inside the second space S2 for supporting the second auxiliary feature 78, e.g., the second extending portion 82 of the second auxiliary feature 78, and the plurality of first retaining features 90 of the first rail 72 of the third slide rail assembly 28 are located inside the third space S3 for supporting the third auxiliary feature 80, e.g., the second extending portion 82 of the third auxiliary feature 80. Detailed description is omitted herein for simplicity.

Figure 12:
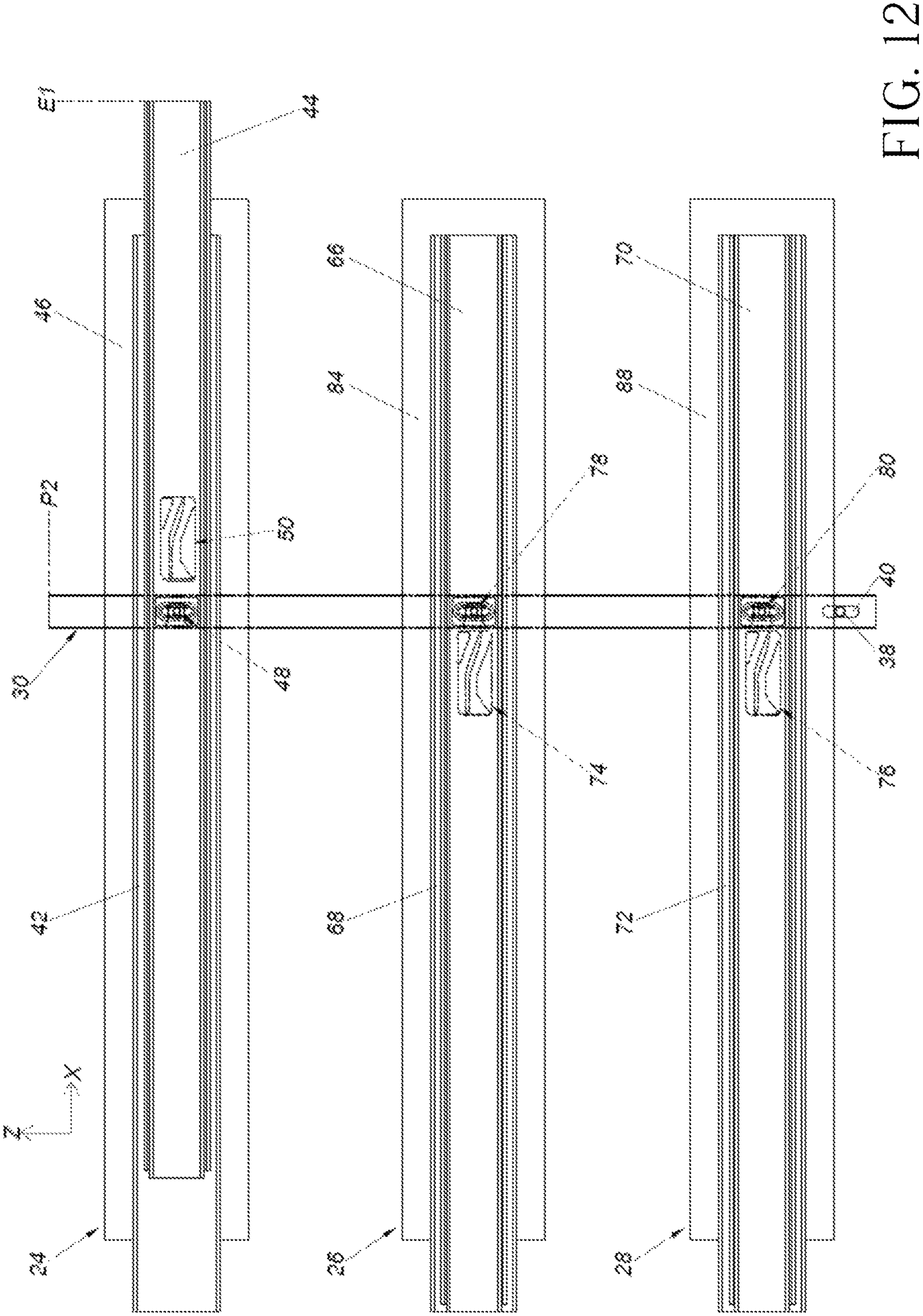
FIG. 12 is a diagram of the slide rail mechanism as the second rail of the first slide rail assembly is located at a first extended position with respect to the first rail of the first slide rail assembly according to the embodiment of the present invention.

As shown in FIG. 12, when the locking member 30 is driven to the second predetermined position P2 by the second rail 44 of the first slide rail assembly 24 displacing to the first extended position E1 with respect to the first rail 42 of the first slide rail assembly 24, an opening movement of the second rail 66 of the second slide rail assembly 26 with respect to the first rail 68 of the second slide rail assembly 26 and an opening movement of the second rail 70 of the third slide rail assembly 28 with respect to the first rail 72 of the third slide rail assembly 28 are allowed.

Figure 13:
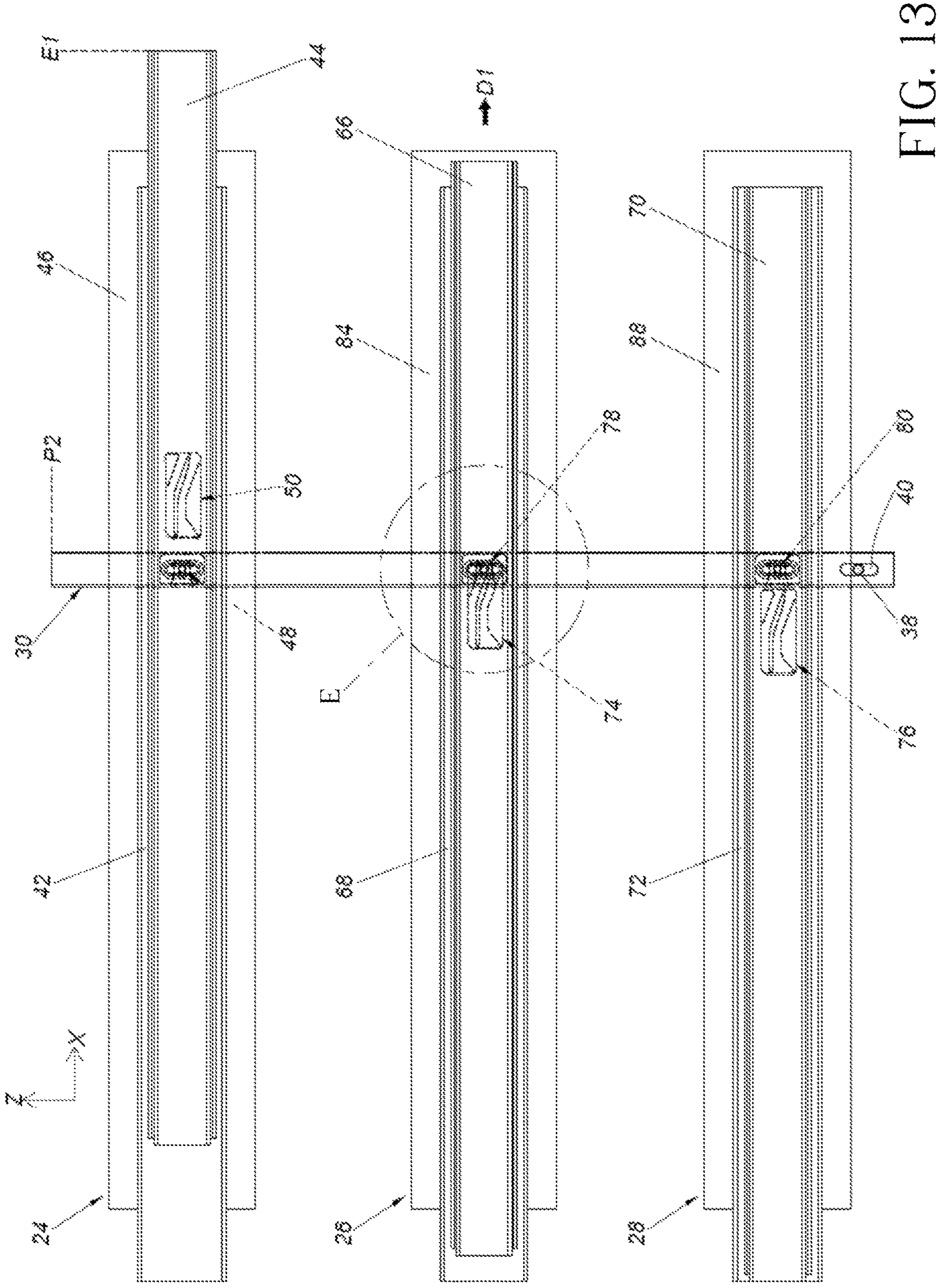
FIG. 13 is a diagram of the slide rail mechanism as a second rail of a second slide rail assembly displaces with respect to a first rail of the second slide rail assembly along the opening direction according to the embodiment of the present invention.
Figure 14:
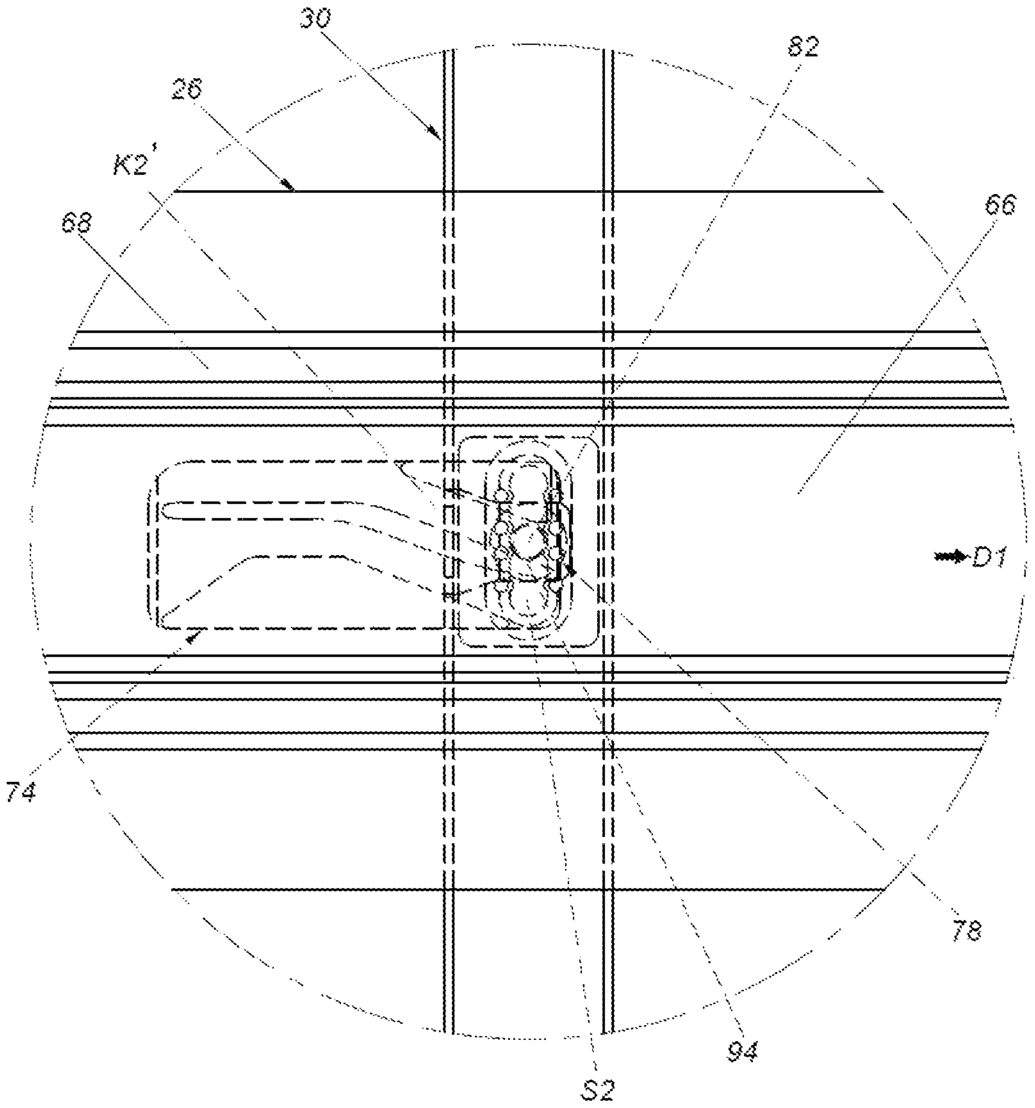
FIG. 14 is an enlarged diagram of an E portion of the slide rail mechanism shown in FIG. 13 according to the embodiment of the present invention.
Figure 15:
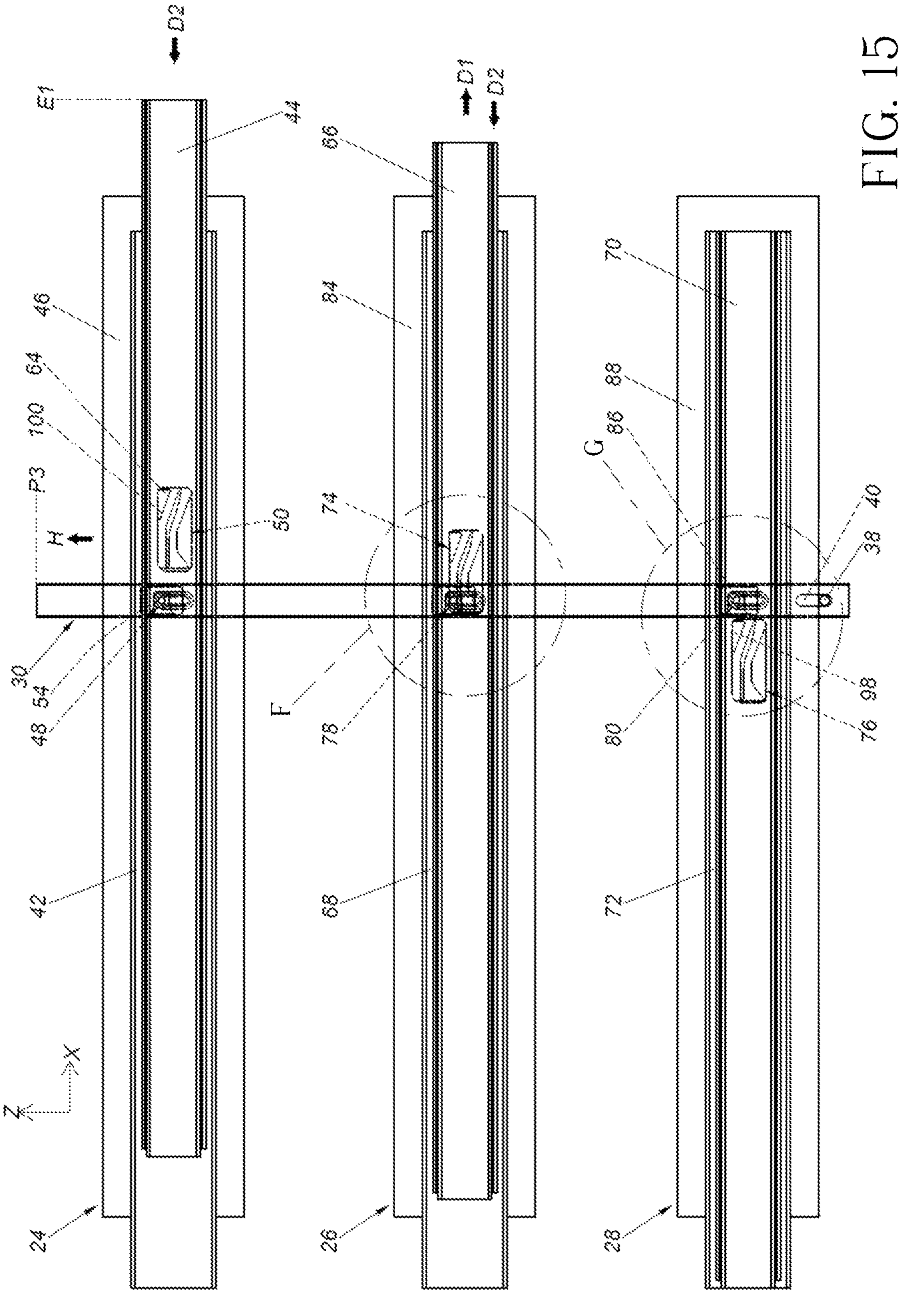
FIG. 15 is a diagram of the slide rail mechanism as the locking member is driven to a third predetermined position by the second rail of the second slide rail assembly displacing with respect to the first rail of the second slide rail assembly along the opening direction according to the embodiment of the present invention.
Figure 16:
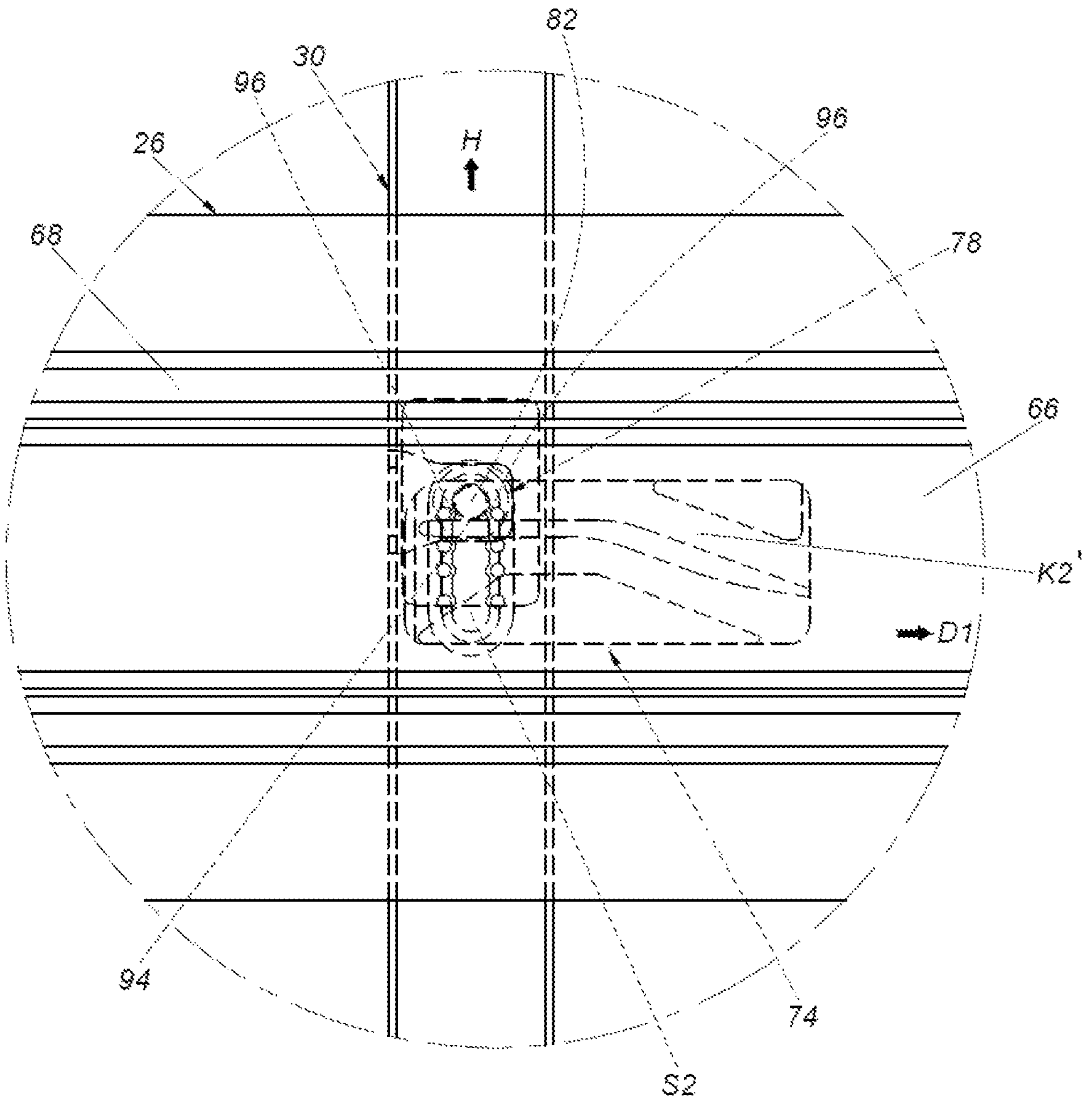
FIG. 16 is an enlarged diagram of an F portion of the slide rail mechanism shown in FIG. 15 according to the embodiment of the present invention.

If the second rail 66 of the second slide rail assembly 26 is opened with respect to the first rail 68 of the second slide rail assembly 26 after the movement of the locking member 30 from the first predetermined position P1 to the second predetermined position P2 as shown in FIG. 12 to FIG. 16, during the opening movement of the second rail 66 of the second slide rail assembly 26 with respect to the first rail 68 of the second slide rail assembly 26, the second working member 74 abuts against the second auxiliary feature 78 for driving the locking member 30 from the second predetermined position P2 as shown in FIG. 12 to FIG. 14 to a third predetermined position P3 as shown in FIG. 15 and FIG. 16.

Preferably, during the opening movement of the second rail 66 of the second slide rail assembly 26 with respect to the first rail 68 of the second slide rail assembly 26, the second auxiliary feature 78, e.g., the second extending portion 82 of the second auxiliary feature 78, enters a second guiding path K2' and then moves along the second guiding path K2' by an abutment of the second portion 94 of the second working member 74 and the second auxiliary feature 78, e.g., the second extending portion 82 of the second auxiliary feature 78, for driving the locking member 30 from the second predetermined position P2 to the third predetermined position P3 along the height direction H. That is, the locking member 30 is driven to further move with respect to the rack 22 or each of the first rail 42 of the first slide rail assembly 24, the first rail 68 of the second slide rail assembly 26 and the first rail 72 of the third slide rail assembly 28 along the height direction H. Besides, as shown in FIG. 15 and FIG. 16, when the second working member 74 is not disengaged from the second auxiliary feature 78, the second portion 94 of the second working member 74 can support the second auxiliary feature 78, e.g., the second extending portion 82 of the second auxiliary feature 78.

It should be noticed that one of the first rail 42 of the first slide rail assembly 24, the first rail 68 of the second slide rail assembly 26 and the first rail 72 of the third slide rail assembly 28 further includes at least one second retaining feature 96. When the locking member 30 is moved to the third predetermined position P3 and the second working member 74 is disengaged from the second auxiliary feature 78 by the second rail 66 of the second slide rail assembly 26 displacing to a second extended position with respect to the first rail 68 of the second slide rail assembly 26 along the opening direction D1, the at least one second retaining feature 96 can support one of the first auxiliary feature 48, the second auxiliary feature 78 and the third auxiliary feature 80 for retaining the locking member 30 at the third predetermined position P3. In this embodiment, by way of example, each of the first rail 42 of the first slide rail assembly 24, the first rail 68 of the second slide rail assembly 26 and the first rail 72 of the third slide rail assembly 28 includes the at least one second retaining feature 96. However, the present invention is not limited to this embodiment.

Specifically, each of the first rail 42 of the first slide rail assembly 24, the first rail 68 of the second slide rail assembly 26 and the first rail 72 of the third slide rail assembly 28 includes a plurality of second retaining features 96 configured to support the first auxiliary feature 48, the second auxiliary feature 78 and the third auxiliary feature 80 for retaining the locking member 30 at the third predetermined position P3. For example, as shown in FIG. 16, the plurality of second retaining features 96 of the first rail 68 of the second slide rail assembly 26 are located inside the second space S2. When the locking member 30 is moved to the third predetermined position P3, the plurality of second retaining features 96 can support the second auxiliary feature 78, e.g., the second extending portion 82 of the second auxiliary feature 78, for retaining the locking member 30 at the third predetermined position P3. Preferably, each of the second retaining features 96 is resilient or flexible and includes a second guiding surface formed in an arc shape, such that the second auxiliary feature 78, e.g., the second extending portion 82 of the second auxiliary feature 78, can pass over the corresponding second retaining features 96 easily in response to a movement of the locking member 30 from the second predetermined position P2 to the third predetermined position P3 along the height direction H.

Besides, the plurality of second retaining features 96 of the first rail 42 of the first slide rail assembly 24, the first rail 68 of the second slide rail assembly 26 and the first rail 72 of the third slide rail assembly 28 can have substantially identical structures. That is, the plurality of second retaining features 96 of the first rail 42 of the first slide rail assembly 24 are located inside the first space S1 for supporting the first auxiliary feature 48, e.g., the second extending portion 54 of the first auxiliary feature 48, and the plurality of second retaining features 96 of the first rail 72 of the third slide rail assembly 28 are located inside the third space S3 for supporting the third auxiliary feature 80, e.g., the second extending portion 82 of the third auxiliary feature 80.

Figure 17:
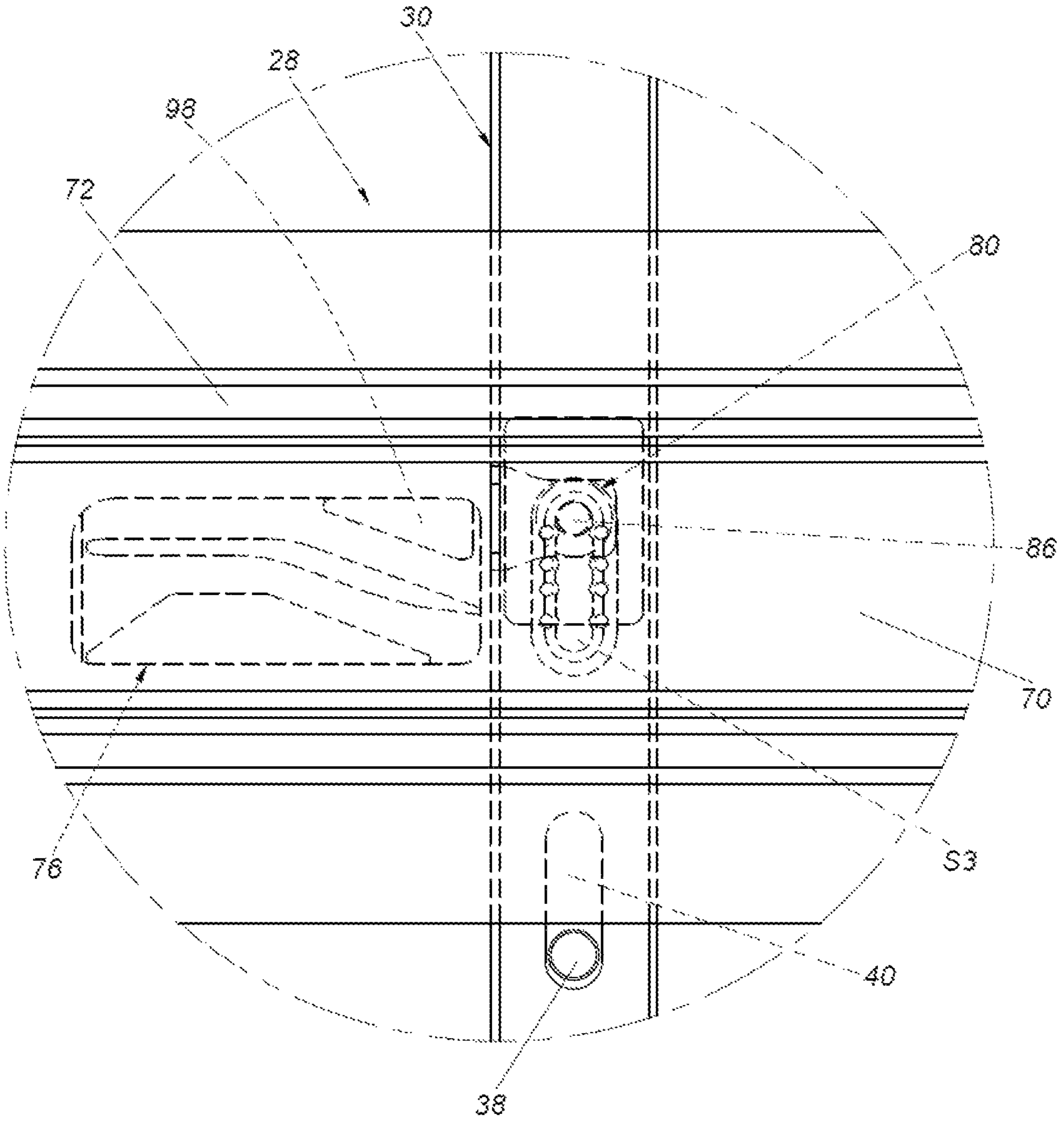
FIG. 17 is an enlarged diagram of a G portion of the slide rail mechanism shown in FIG. 15 according to the embodiment of the present invention.
Figure 18:
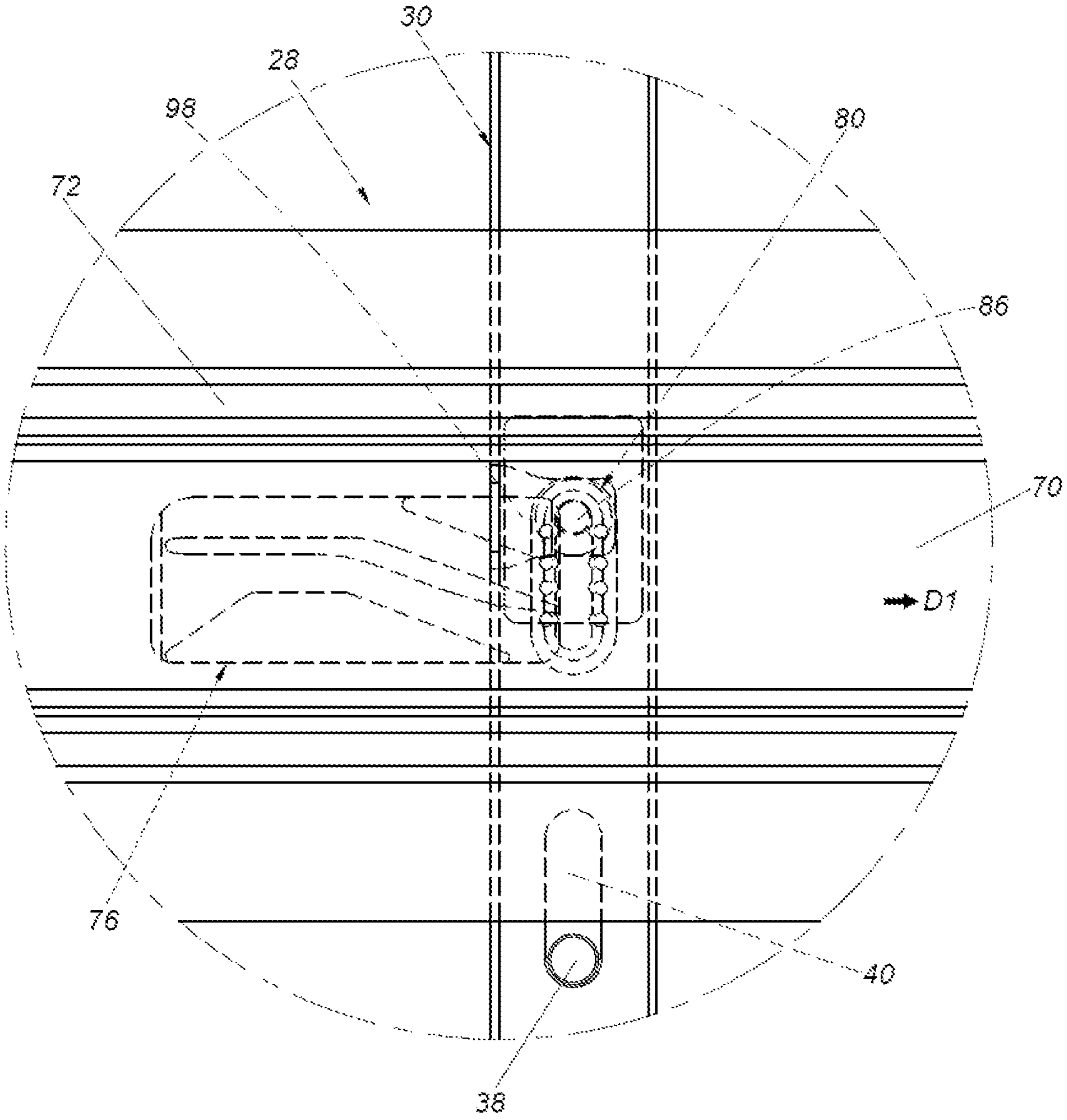
FIG. 18 is a diagram of the slide rail mechanism as a second rail of a third slide rail assembly is prevented from displacing with respect to a first rail of the third slide rail assembly along the opening direction according to the embodiment of the present invention.

As shown in FIG. 15, FIG. 17 and FIG. 18, when the locking member 30 is located at the third predetermined position P3 after the opening movement of the second rail 44 of the first slide rail assembly 24 and the opening movement of the second rail 66 of the second slide rail assembly 26, the third auxiliary feature 80, e.g., the second extending portion 86 of the third auxiliary feature 80, is configured to block the third working member 76, e.g., a third portion 98 of the third working member 76, for preventing the opening movement of the second rail 70 of the third slide rail assembly 28 with respect to the first rail 72 of the third slide rail assembly 28 to a third extended position along the opening direction D1. In this embodiment, by way of example, the third auxiliary feature 80, e.g., the second extending portion 86 of the third auxiliary feature 80, can block the third working member 76, e.g., the third portion 98 of the third working member 76, when the locking member 30 is located at the third predetermined position P3 and the second rail 70 of the third slide rail assembly 28 displaces with respect to the first rail 72 of the third slide rail assembly 28 from a retracted position as shown in FIG. 17 to a position as shown in FIG. 18 along the opening direction D1.

It should be noticed that when it is desired to terminate a blocking or a locking between the second rail 70 of the third slide rail assembly 28 and the locking member 30, a user can move the second rail 44 of the first slide rail assembly 24 to displace away from the first extended position E1 along a retracting direction D2, or move the second rail 66 of the second slide rail assembly 26 to displace away from the second extended position along the retracting direction D2, for driving the locking member 30 from the third predetermined position P3 back to the second predetermined position P2, so as to terminate a blocking or a locking between the third auxiliary feature 80, e.g., the second extending portion 86 of the third auxiliary feature 80, and the second rail 70 of the third slide rail assembly 28.

For example, during a retracting movement of the second rail 44 of the first slide rail assembly 24 away from the first extended position E1 along the retracting direction D2, a first predetermining guiding segment 100 of the third portion 64 of the first working member 50 can abut against the first auxiliary feature 48, e.g., the second extending portion 54 of the first auxiliary feature 48, for driving the locking member 30 from the third predetermined position P3 to the second predetermined position P2 along a direction opposite to the height direction H, such that the second extending portion 86 of the third auxiliary feature 80 on the locking member 30 does not block the third working member 76, e.g., the third portion 98 of the third working member 76, for allowing the second rail 70 of the third slide rail assembly 28 to be opened with respect to the first rail 72 of the third slide rail assembly 28 to the third extended position along the opening direction D1.

From the above, the slide rail mechanism includes the following characteristics. When the second rail 44 of the first slide rail assembly 24 and the second rail 66 of the second slide rail assembly 26 are opened with respect to the first rail 42 of the first slide rail assembly 24 and the first rail 68 of the second slide rail assembly 26, the locking member 30 is moved to a blocking position or a locking position, e.g., the third predetermined position P3, for blocking the third working member 76 on the second rail 70 of the third slide rail assembly 28 for preventing the second rail 70 of the third slide rail assembly 28 from being opened with respect to the first rail 72 of the third slide rail assembly 28. That is, the locking member 30 can act as an improved interlock for allowing only the second rails of two of the slide rail assemblies, e.g., movable rails, to be opened with respect to the first rails of the two of the slide rail assemblies, e.g., fixed rails, and for preventing the second rail of the other one of the slide rail assemblies from being opened by blocking or locking the second rail of the other one of the slide rail assemblies. Therefore, when the slide rail mechanism is adapted for the rack or the cabinet, the slide rail mechanism provides an enhanced using safety.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail mechanism comprising:

a first slide rail assembly;

a second slide rail assembly;

a third slide rail assembly, each of the first slide rail assembly, the second slide rail assembly and the third slide rail assembly comprising a first rail and a second rail displaceable with respect to the first rail;

a first working member arranged on the second rail of the first slide rail assembly;

a second working member arranged on the second rail of the second slide rail assembly;

a third working member arranged on the second rail of the third slide rail assembly;

a locking member movable with respect to the first rail of each of the first slide rail assembly, the second slide rail assembly and the third slide rail assembly;

a first auxiliary feature arranged on the locking member;

a second auxiliary feature arranged on the locking member; and a third auxiliary feature arranged on the locking member;

wherein the first working member abuts against the first auxiliary feature for driving the locking member from a first predetermined position to a second predetermined position during an opening movement of the second rail of the first slide rail assembly with respect to the first rail of the first slide rail assembly;

wherein the second working member abuts against the second auxiliary feature for driving the locking member from the second predetermined position to a third predetermined position during an opening movement of the second rail of the second slide rail assembly with respect to the first rail of the second slide rail assembly;

wherein the third auxiliary feature blocks the third working member for preventing an opening movement of the second rail of the third slide rail assembly with respect to the first rail of the third slide rail assembly when the locking member is located at the third predetermined position;

wherein a first space is formed on the first rail of the first slide rail assembly, and the first auxiliary feature passes through the first space to cooperate with the first working member arranged on the second rail of the first slide rail assembly.

2. The slide rail mechanism of claim 1, wherein each of the first working member, the second working member and the third working member comprises a first portion, a second portion and a third portion, a first guiding path is formed between the first portion and the second portion of each of the first working member, the second working member and the third working member, and a second guiding path is formed between the second portion and the third portion of each of the first working member, the second working member and the third working member.

3. The slide rail mechanism of claim 2, wherein the first auxiliary feature enters the first guiding path of the first working member and moves along the first guiding path by an abutment of the first portion of the first working member and the first auxiliary feature for driving the locking member from the first predetermined position to the second predetermined position along a height direction during the opening movement of the second rail of the first slide rail assembly with respect to the first rail of the first slide rail assembly.

4. The slide rail mechanism of claim 3, wherein the second auxiliary feature enters the second guiding path of the second working member and moves along the second guiding path by an abutment of the second portion of the second working member and the second auxiliary feature for driving the locking member from the second predetermined position to the third predetermined position along the height direction during the opening movement of the second rail of the second slide rail assembly with respect to the first rail of the second slide rail assembly.

5. The slide rail mechanism of claim 4, wherein the third auxiliary feature blocks the third portion of the third working member for preventing the opening movement of the second rail of the third slide rail assembly with respect to the first rail of the third slide rail assembly when the locking member is located at the third predetermined position.

6. The slide rail mechanism of claim 1, wherein a second space is formed on the first rail of the second slide rail assembly, and the second auxiliary feature passes through the second space to cooperate with the second working member arranged on the second rail of the second slide rail assembly.

7. The slide rail mechanism of claim 6, wherein a third space is formed on the first rail of the third slide rail assembly, and the third auxiliary feature passes through the third space to cooperate with the third working member arranged on the second rail of the third slide rail assembly.

8. A slide rail mechanism comprising:

a first slide rail assembly;

a second slide rail assembly;

a third slide rail assembly, each of the first slide rail assembly, the second slide rail assembly and the third slide rail assembly comprising a first rail and a second rail displaceable with respect to the first rail;

a first working member arranged on the second rail of the first slide rail assembly:

a second working member arranged on the second rail of the second slide rail assembly;

a third working member arranged on the second rail of the third slide rail assembly;

a locking member movable with respect to the first rail of each of the first slide rail assembly, the second slide rail assembly and the third slide rail assembly;

a first auxiliary feature arranged on the locking member;

a second auxiliary feature arranged on the locking member; and a third auxiliary feature arranged on the locking member;

wherein the first working member abuts against the first auxiliary feature for driving the locking member from a first predetermined position to a second predetermined position during an opening movement of the second rail of the first slide rail assembly with respect to the first rail of the first slide rail assembly;

wherein the second working member abuts against the second auxiliary feature for driving the locking member from the second predetermined position to a third predetermined position during an opening movement of the second rail of the second slide rail assembly with respect to the first rail of the second slide rail assembly;

wherein the third auxiliary feature blocks the third working member for preventing an opening movement of the second rail of the third slide rail assembly with respect to the first rail of the third slide rail assembly when the locking member is located at the third predetermined position;

wherein the first rail of one of the first slide rail assembly, the second slide rail assembly and the third slide rail assembly comprises a first retaining feature, and the first retaining feature supports one of the first auxiliary feature, the second auxiliary feature and the third auxiliary feature for retaining the locking member at the second predetermined position when the locking member is moved to the second predetermined position.

9. The slide rail mechanism of claim 8, wherein the first rail of one of the first slide rail assembly, the second slide rail assembly and the third slide rail assembly comprises a second retaining feature, and the second retaining feature supports one of the first auxiliary feature, the second auxiliary feature and the third auxiliary feature for retaining the locking member at the third predetermined position when the locking member is moved to the third predetermined position.

10. A slide rail mechanism adapted for a rack, the slide rail mechanism comprising:

a first slide rail assembly configured to be mounted on the rack;

a second slide rail assembly configured to be mounted on the rack;

a third slide rail assembly configured to be mounted on the rack, and each of the first slide rail assembly, the second slide rail assembly and the third slide rail assembly comprising a first rail and a second rail longitudinally displaceable with respect to the first rail;

a first working member arranged on the second rail of the first slide rail assembly;

a second working member arranged on the second rail of the second slide rail assembly;

a third working member arranged on the second rail of the third slide rail assembly;

a locking member configured to be movable with respect to the rack;

a first auxiliary feature arranged on the locking member;

a second auxiliary feature arranged on the locking member; and a third auxiliary feature arranged on the locking member;

wherein the first working member abuts against the first auxiliary feature for driving the locking member from a first predetermined position to a second predetermined position during an opening movement of the second rail of the first slide rail assembly with respect to the first rail of the first slide rail assembly;

wherein an opening movement of the second rail of the second slide rail assembly with respect to the first rail of the second slide rail assembly and an opening movement of the second rail of the third slide rail assembly with respect to the first rail of the third slide rail assembly are allowed when the locking member is located at the second predetermined position;

wherein the second working member abuts against the second auxiliary feature for driving the locking member from the second predetermined position to a third predetermined position during the opening movement of the second rail of the second slide rail assembly with respect to the first rail of the second slide rail assembly;

wherein the third auxiliary feature blocks the third working member for preventing the opening movement of the second rail of the third slide rail assembly with respect to the first rail of the third slide rail assembly when the locking member is located at the third predetermined position.

11. The slide rail mechanism of claim 10, wherein each of the first working member, the second working member and the third working member comprises a first portion, a second portion and a third portion, a first guiding path is formed between the first portion and the second portion of each of the first working member, the second working member and the third working member, and a second guiding path is formed between the second portion and the third portion of each of the first working member, the second working member and the third working member.

12. The slide rail mechanism of claim 11, wherein the first auxiliary feature enters the first guiding path of the first working member and moves along the first guiding path by an abutment of the first portion of the first working member and the first auxiliary feature for driving the locking member from the first predetermined position to the second predetermined position along a height direction during the opening movement of the second rail of the first slide rail assembly with respect to the first rail of the first slide rail assembly.

13. The slide rail mechanism of claim 12, wherein the second auxiliary feature enters the second guiding path of the second working member and moves along the second guiding path by an abutment of the second portion of the second working member and the second auxiliary feature for driving the locking member from the second predetermined position to the third predetermined position along the height direction during the opening movement of the second rail of the second slide rail assembly with respect to the first rail of the second slide rail assembly.

14. The slide rail mechanism of claim 13, wherein the third auxiliary feature blocks the third portion of the third working member for preventing the opening movement of the second rail of the third slide rail assembly relative to the first rail of the third slide rail assembly when the locking member is located at the third predetermined position.

15. The slide rail mechanism of claim 10, wherein a first space is formed on the first rail of the first slide rail assembly, and the first auxiliary feature passes through the first space to cooperate with the first working member arranged on the second rail of the first slide rail assembly.

16. The slide rail mechanism of claim 15, wherein a second space is formed on the first rail of the second slide rail assembly, and the second auxiliary feature passes through the second space to cooperate with the second working member arranged on the second rail of the second slide rail assembly.

17. The slide rail mechanism of claim 16, wherein a third space is formed on the first rail of the third slide rail assembly, and the third auxiliary feature passes through the third space to cooperate with the third working member arranged on the second rail of the third slide rail assembly.

18. The slide rail mechanism of claim 10, wherein the first rail of one of the first slide rail assembly, the second slide rail assembly and the third slide rail assembly comprises a first retaining feature, and the first retaining feature supports one of the first auxiliary feature, the second auxiliary feature and the third auxiliary feature for retaining the locking member at the second predetermined position when the locking member is moved to the second predetermined position.

19. The slide rail mechanism of claim 18, wherein the first rail of one of the first slide rail assembly, the second slide rail assembly and the third slide rail assembly comprises a second retaining feature, and the second retaining feature supports one of the first auxiliary feature, the second auxiliary feature and the third auxiliary feature for retaining the locking member at the third predetermined position when the locking member is moved to the third predetermined position.

* * * * *